US008681683B2

(12) United States Patent
Giaretta et al.

(10) Patent No.: US 8,681,683 B2
(45) Date of Patent: Mar. 25, 2014

(54) INTER-SYSTEM IDLE MODE MOBILITY

(75) Inventors: Gerardo Giaretta, San Diego, CA (US);
George Tsirtsis, London (GB); Kalle I. Ahmavaara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1009 days.

(21) Appl. No.: 12/130,525

(22) Filed: May 30, 2008

(65) Prior Publication Data

US 2008/0304434 A1    Dec. 11, 2008

Related U.S. Application Data

(60) Provisional application No. 60/943,282, filed on Jun. 11, 2007.

(51) Int. Cl.
*H04W 4/00*    (2009.01)
(52) U.S. Cl.
USPC ........... 370/313; 370/338; 370/328; 370/389; 455/517; 455/433; 455/453
(58) Field of Classification Search
USPC ......... 370/313, 331, 338, 328, 389; 455/517, 455/433, 453
See application file for complete search history.

(56) References Cited

U.S. PATENT DOCUMENTS

| 6,707,809 | B1 * | 3/2004 | Warrier et al. ................ 370/351 |
| 6,819,659 | B1 * | 11/2004 | Palat et al. .................... 370/331 |
| 6,862,274 | B1 * | 3/2005 | Tsao et al. .................... 370/338 |
| 7,227,863 | B1 * | 6/2007 | Leung et al. .................. 370/390 |
| 7,342,930 | B2 * | 3/2008 | Ishida et al. ............. 370/395.54 |
| 2001/0036834 | A1 * | 11/2001 | Das et al. ..................... 455/458 |
| 2003/0012179 | A1 * | 1/2003 | Yano et al. ................... 370/352 |
| 2003/0142650 | A1 * | 7/2003 | Fan .............................. 370/338 |
| 2004/0029555 | A1 * | 2/2004 | Tsai et al. ..................... 455/403 |

(Continued)

FOREIGN PATENT DOCUMENTS

| RU | 2300847 C2 | 6/2007 |
| WO | WO2004064337 A1 | 7/2004 |
| WO | WO2006093288 A1 | 9/2006 |
| WO | WO2007039016 | 4/2007 |

OTHER PUBLICATIONS

Karim El Malki et al, "Simultaneous Bindings for Mobile IPv6 Fast Handovers", Jul. 1, 2005, IETF Standard Working Draft, pp. 1-13.*

(Continued)

*Primary Examiner* — Rasheed Gidado
(74) *Attorney, Agent, or Firm* — Eric Ho

(57) ABSTRACT

Providing for inter-system idle mobility management for independent mobile networks is described herein. By way of example, registration of multiple mobile IP (MIP) addresses to a mobile device can be utilized to facilitate inter-system device tracking. An Internet Protocol (IP) home agent that serves the mobile device can associate the MIPs with a home IP address of the mobile device. When communication is received for the home address, device paging can be initiated by utilizing at least a plurality of the MIPs bound to the home address. A mobile device response can provide a current active network address, and the received communication can be delivered via such active network address. As disclosed herein, the mobile device can switch attachment among the networks without signaling such networks, based on the multiple address bindings. Accordingly, significant power reduction can be afforded to mobile devices in idle mode.

55 Claims, 15 Drawing Sheets

(56) References Cited

U.S. PATENT DOCUMENTS

| | | | |
|---|---|---|---|
| 2004/0047348 A1* | 3/2004 | O'Neill | 370/389 |
| 2004/0092260 A1* | 5/2004 | Thubert et al. | 455/435.1 |
| 2006/0031534 A1* | 2/2006 | Ishiyama et al. | 709/227 |
| 2007/0104170 A1 | 5/2007 | Leung et al. | |
| 2007/0105567 A1* | 5/2007 | Mohanty et al. | 455/458 |
| 2007/0165552 A1 | 7/2007 | Kasapi et al. | |
| 2007/0274262 A1* | 11/2007 | Hung et al. | 370/331 |
| 2008/0259848 A1* | 10/2008 | Aso et al. | 370/328 |

OTHER PUBLICATIONS

Shariq et al, "Comparative Performance Analysis of Mobile IPv6 Protocols: Special Reference to Simultaneous Bindings", Journal of Computer Sciences, 2006 Science Publications.*

Shiao-Li et al, "Benefits of Multiple care-of addresses and home addresses for low power multimode mobiles", IETF Standard working Draft, Oct. 1, 2005, pp. 1-7.*

International Search Report and Written Opinion—PCT/US2008/066449, International Search Authority—European Patent Office—Nov. 12, 2008.

Ramjee R et al., "IP paging service for mobile hosts" Proceedings of the 7th. Annual International Conference on Mobile Computing and Networking. Mobicom 2001. Rome, Italy, Jul. 16-21, 2001; [Annual International Conference on Mobile Computing and Networking], New York, NY: ACM, US, vol. Conf. 7, Jul. 16, 2001, pp. 332-344, XP001072016 ISBN: 978-1-58113-422-3 abstract p. 334, paragraph 2.1.

Taiwan Search Report—TW097121780—TIPO—Jun. 30, 2012.

* cited by examiner

INTER-SYSTEM IDLE MODE MOBILITY

CLAIM OF PRIORITY UNDER 35 U.S.C. §119

The present Application for Patent claims priority to Provisional Application No. 60/943,282 entitled INTER SYSTEM IDLE MODE MOBILITY filed Jun. 11, 2007, and assigned to the assignee hereof and hereby expressly incorporated by reference herein.

BACKGROUND

I. Field

The following relates generally to wireless communication, and more specifically to providing idle mode mobility management for multiple mobile communication environments.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

For mobile wireless communications, network mobility management is one important function that enables mobile communications. Base stations within a radio access network (RAN) serving a geographic area, or cell cite, can broadcast registration information within that cell site. The broadcast information can include an identity of the RAN and/or transmitting base station. Mobile devices configured to recognize the RAN identity can provide identification information of the mobile device in return (e.g., mobile ID, mobile device capabilities, subscriber profile information, etc.) to attach to, or become active on, the RAN. Once the response is received at the base station, a home register on the mobile network that serves the particular mobile device is updated with the device's current location. Thus, the network is able to route traffic to the device.

If the mobile device moves to a different geographic location, it may lose contact with the RAN and the mobile network, at least until a new RAN is encountered or communication with the original RAN is re-established. If the mobile device encounters a new RAN, it can re-attach to the mobile network by way of the new RAN and continue wireless communications. The network can update the location of the mobile device to indicate the RAN and base station currently coupled with the device; traffic for the device will thus be routed to the new base station.

In order to preserve power and battery life, the mobile device is typically in an idle mode while not actively participating in a call or data session. In idle mode, the mobile device processes only a portion of wireless information transmitted by a serving base station. For instance, registration information identifying a serving RAN or location/tracking area is typically observed, as well as paging requests submitted by the base station. Thus, the mobile device can identify whether an incoming call is being received (e.g., based on a paging request), or whether it has left a location/tracking area (e.g., based on the registration information). Most other information is ignored, greatly reducing power consumption involved in processing received transmissions. Thus, while ignoring most information not requiring the mobile device to 'wake up', the mobile device can still receive incoming calls and conduct location area updates with the mobile network. If the latter occurs, the mobile will typically 'wake up' long enough to transmit a signal to a base station within a new tracking area, updating the network of the mobile device's new location, and then return again to idle mode to conserve power. Thus, mobility and idle mode management are central processes surrounding effective mobile communication, both to maintain contact with the mobile device and to preserve communication ability when not connected to a fixed power source.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for inter-system idle mobility management for mobile communications systems having independent tracking and paging. Registration of multiple mobile IP (MIP) addresses to a mobile device can facilitate the inter-system mobility tracking. In at least some aspects of the disclosure, a home agent that serves the mobile device can associate the MIPs with a home IP address of the mobile device provide by an IP gateway. The home agent can activate system paging at each system attached to the mobile device utilizing the MIPs. The device can respond to the home agent when it receives a page, and request deletion or de-activation of MIPs not currently utilized by the mobile device. The home agent can then update the binding to associate an active MIP with the IP address and forward received data to the mobile device via the active mobile network/active MIP. By binding multiple MIPs to the mobile device and employing this information in mobility management, the mobile can switch between mobile systems without having to signal the network. Significant power reduction can be afforded to mobile devices in such an environment, increasing battery life and reducing mobile operating costs in many circumstances.

Also disclosed is a method of inter-system mobility management. The method can comprise receiving multiple mobile Internet Protocol (MIP) bindings for a mobile device and mapping a system address of each of the multiple MIP bindings to a home address of the mobile device. The method can further comprise employing a plurality of the bindings to notify the mobile device of a received data packet communication.

In addition to the foregoing, disclosed is a MIP home agent that provides inter-system mobility management. The MIP home agent can comprise a network interface that obtains data initiated by a mobile device, the data indicates multiple MIP bindings for the mobile device and a correlation module that maps a system address for each of the multiple MIP bindings to a home address of the mobile device. The MIP home agent can further comprise memory for storing at least the data and the address mappings and a routing module that employs a plurality of the bindings to notify the mobile device of a received data packet communication.

According to additional aspects, provided is an apparatus that provides inter-system mobility management. The apparatus can comprise means for receiving multiple MIP bindings for a mobile device and means for mapping a system address of each of the multiple MIP bindings to a home address of the mobile device. Furthermore, the apparatus can comprise means for employing a plurality of the bindings to notify the mobile device of a received data packet communication.

In accordance with at least one other aspect, disclosed is a processor configured to provide inter-system mobility management. The processor can comprise a first module that receives multiple MIP bindings for a mobile device and a second module that maps a system address of each of the multiple MIP bindings to a home address of the mobile device. The processor can additionally comprise a third module that employs a plurality of the bindings to notify the mobile device of a received data packet communication.

According to one or more other aspects, disclosed is a computer-readable medium comprising computer-readable instructions configured to provide inter-system mobility management. The instructions are executable by at least one computer to receive multiple MIP bindings for a mobile device and map a system address of each of the multiple MIP bindings to a home address of the mobile device. In addition to the foregoing, the instructions can be executable by the at least one computer to employ a plurality of the bindings to notify the mobile device of a received data packet communication.

According to other aspects, provided is a method for facilitating idle mobility management. The method can comprise obtaining multiple system IP addresses from mobile networks that independently manage idle mobility and providing the multiple addresses to a network routing device that binds the multiple addresses to a home address. The method can further comprise updating the network routing device to identify one of the multiple addresses as an active address.

In still other aspects, disclosed is an apparatus that facilitates idle mobility management. The apparatus can comprise memory that stores instructions suitable to conduct wireless communication with a remote device and a received signal processor that obtains multiple system IP addresses from mobile networks that independently manage idle mobility. Furthermore, the apparatus can comprise a transmission processor that provides the multiple addresses to a network routing device that binds the multiple addresses to a home address. Additionally, the apparatus can comprise an activation module that updates the network routing device to identify one of the multiple addresses as an active address.

According to at least one other aspect, provided is an apparatus that facilitates idle mobility management. The apparatus can comprise means for storing instructions suitable to conduct wireless communication with a remote device and means for obtaining multiple system IP addresses from mobile networks that independently manage idle mobility. The apparatus can also comprise means for providing the multiple addresses to a network routing device that binds the multiple addresses to a home address and means for updating the network routing device to identify one of the multiple addresses as an active address.

In accordance with still other aspects, disclosed is a processor configured to facilitate idle mobility management. The processor can comprise a first module that obtains multiple system IP addresses from mobile networks that independently manage idle mobility and a second module that provides the multiple addresses to a network routing device that binds the multiple addresses to a home address. Furthermore, the processor can comprise a third module that updates the network routing device to identify one of the multiple addresses as an active address.

In at least one further aspect, disclosed is a computer-readable medium comprising computer-readable instructions configured to facilitate idle mobility management. The instructions can be executable by at least one computer to obtain multiple system IP addresses from mobile networks that independently manage idle mobility and to provide the multiple addresses to a network routing device that binds the multiple addresses to a home address. The instructions can further be executable by the at least one computer to update the network routing device to identify one of the multiple addresses as an active address.

In addition to the foregoing, disclosed in one or more aspects is a method of conducting mobile mobility management. The method can comprise registering a mobile device with a mobile network and paging the mobile device within a location area. The method can additionally comprise setting a state for the mobile device to idle with respect to the location area if no response to the paging is received.

According to other aspects, provided is a radio access network (RAN) base station. The base station can comprise a transceiver that broadcasts wireless over-the-air (OTA) messages to a cellular site and receives OTA message responses from remote devices and a tracking module that registers a mobile device with a mobile network associated with the base station. The base station can also comprise a communication module that employs the transceiver to page the mobile device within a location area and an activity module that sets a state for the mobile device to idle with respect to the location area if no response to the page is received.

In at least one other aspect, disclosed is an apparatus that conducts mobile mobility management. The apparatus can comprise means for broadcasting wireless over-the-air (OTA) messages to a cellular site and receiving OTA message responses from remote devices and means for registering a mobile device with a mobile network. Moreover, the apparatus can comprise means for paging the mobile device within a location area and means for setting a state for the mobile device to idle with respect to the location area if no response to the paging is received.

According to one or more other aspects, provided is a processor configured to conduct mobile mobility management. The processor can comprise a first module that registers a mobile device with a mobile network and a second module that pages the mobile device within a location area. The processor can also comprise a third module that sets a state for the mobile device to idle with respect to the location area if no response to the paging is received.

In accordance with one or more additional aspects, provided is a computer-readable medium comprising computer-readable instructions configured to conduct mobile mobility management. The instructions can be executable by at least one computer to register a mobile device with a mobile network and to page the mobile device within a location area.

Further, the instructions can be executable by the at least one computer to set a state for the mobile device to idle with respect to the location area if no response to the paging is received.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
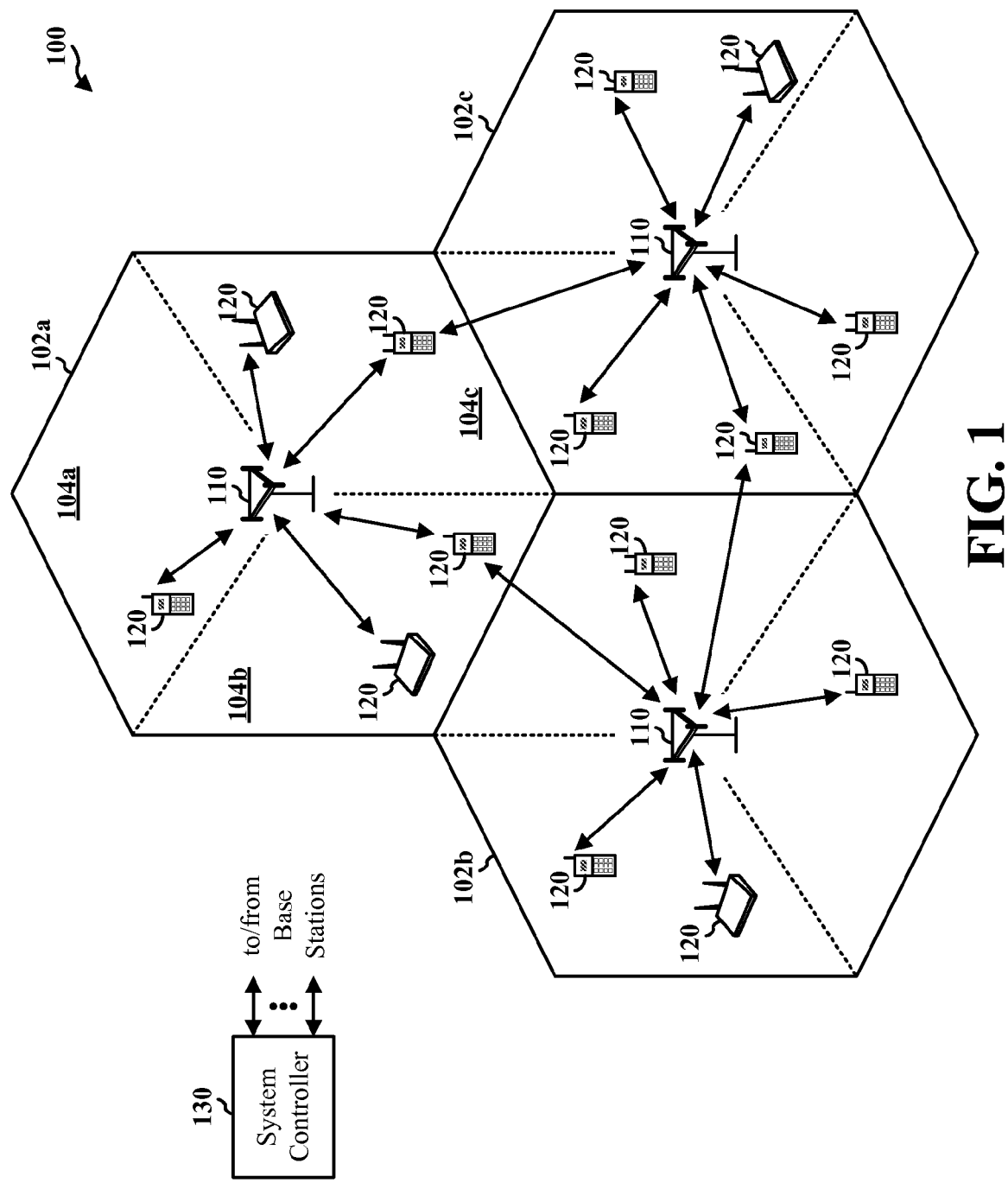
FIG. 1 illustrates a block diagram of an example system that provides wireless communication in accordance with aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are descried in the context of determining characteristics of one or more wireless channels and providing a handover determination based in part on magnitudes of the determined characteristics. One skilled in the art should appreciate that similar techniques could apply to other communication environments.

The subject disclosure provides for inter-system idle mobility management. Successful mobile wireless communications rely on a mobile network's ability to track location of mobile devices. One way for networks to track devices is by identifying various location or tracking areas, and maintaining positions of mobile devices with respect to the location/tracking areas. The network can send out pilot synchronization signals that include an ID of a tracking area. If a mobile device receives such a signal, it can reply to an initiating transceiver, which can forward the mobile ID and other registration information to an associated mobile network. The mobile network then associates the mobile device with the ID of the tracking area, utilizing that tracking area to contact and forward traffic to the mobile device.

In order to preserve mobile device battery power, mobiles typically only process a portion of incoming network transmissions. Synchronization information, providing tracking area ID information, and paging signals, indicating incoming calls to the mobile, can be tracked while much other information is largely ignored. Such a state, where only a small portion of incoming transmissions are processed, is termed an idle state. In idle state the mobile device consumes significantly less power than in an active state, when the device is processing a larger portion of incoming transmission (e.g., when participating in voice and/or data communications). Managing location of mobile devices, as discussed above, requires some signaling from the mobile device in most cases. Such signaling reduces battery power, however, so the fewer location updates required the longer mobile battery power will last.

Where a mobile device has only a single network interface chip, allowing it to only utilize a single network, location updates are typically not very frequent. Where the mobile device remains in a single location, tracking area updates will rarely occur, requiring almost no signaling from the mobile device. However, multi-mode devices, having multiple network interface chips enabling the device to communicate with multiple mobile network types (e.g., second generation [2G] network, a third generation partnership project [3GPP] network, third generation partnership project 2 [3GPP2] network, wireless fidelity [WiFi] network, etc.), are often subject to additional network signaling. For instance, where a device is connected with multiple systems (e.g., a 2G system and a 3GPP system), the device can choose between networks depending on signal quality. Typically switching from one network to another requires additional signaling, since the networks do not share device mobility. Accordingly, each switch from one network to another in idle mode could involve power consuming signaling.

For data communication, mobile networks typically include a home agent that obtains a home Internet Protocol address for a mobile device. The home agent acts as a stationary proxy for mobile devices in mobile IP (MIP) communication. Because the home agent has a stationary IP address, data can be routed to the home agent according to typical IP network protocols.

Each mobile network provides a temporary care of Address (CoA) to mobile devices served by the network. The CoA enables the mobile network to identify and distinguish mobile devices registered on the network for data communications. The CoA is analogous to a private IP address that is relevant only local to a particular network.

Once the mobile device obtains a network CoA, the device can update the home agent with the CoA. The CoA enables the home agent to identify which mobile network the mobile device is attached to and, accordingly, which mobile network gateway to forward data traffic routed to the mobile device. The home agent can then bind the CoA to the home IP address of the mobile device. Accordingly, IP communication directed to the home address of the mobile device is intercepted by the home agent and forwarded to a particular network gateway serving the mobile device at the device's current location. If the mobile device is a single mode device, the CoA might change only infrequently, for instance when the device is powered off and then on again. This is because a single mode device will only register with a single type of network and only need a CoA provided by that network. For a multi-mode device, however, a new CoA can be needed for each type of network (e.g., 2G, 3GPP, 3GPP2, WiFi, etc.) that the multi-mode device registers on. Further, if the multi-mode device swaps between one network type and another network type, each change might result in a different CoA provided by each network, depending on a time interval and/or change in device location between successive registrations.

As discussed above, swapping between one network and another can cost a mobile device a significant amount of battery power due to signaling requirements of the networks. In one aspect of the subject disclosure, network signaling involved in switching between one mobile system (e.g., global system for mobile communication [GSM] network) and another mobile system (e.g., universal mobile telecommunication system [UMTS] network) can be reduced or avoided, allowing the device to stay in idle mode and significantly increase battery life in many circumstances. In such aspects, a home agent serving a mobile device can obtain a CoA for each mobile system that the mobile device is attached to. The CoAs can be bound to a home IP address for the mobile device. If an incoming data communication sent to the home IP address is received by the home agent, the home agent utilizes a plurality of the CoAs to initiate paging at multiple mobile networks. Paging can be initiated by forwarding the entire data communication, a portion of the data communication, or just a notification message pertaining to the data communication to an IP gateway (e.g., a gateway general packet radio system support node [GGSN]) associated with each of the plurality of CoAs. (As an example, where the entire data communication is not sent, the communication can be buffered and stored for later transmission or can be discarded, depending on available memory.) The mobile device can then receive the page if it is active on any of the plurality of CoAs. Accordingly, the mobile device need not conduct additional signaling when it swaps at least among the plurality of mobile networks associated with the plurality of CoAs, since the home agent initiates paging on each of them. As a result, the mobile device can achieve inter-system idle mobility free from signaling requirements, once registered on multiple systems.

In addition to the foregoing, when a multi-mode mobile device receives a page from an attached mobile network, the mobile device can 'wake up' from idle mode and send a binding update to the home agent. The binding update can indicate an active CoA associated with the attached mobile network, or indicate inactive CoAs of networks the mobile device is not currently attached to, or both. Thus, the home agent can update the home address—CoA binding to indicate the active CoA, and continue data transmissions with the mobile network associated with the active CoA. Data transmission to other mobile networks can be terminated to reduce inter-system redundant paging/bandwidth utilization.

While actively engaging in voice and/or data communication, the mobile device can update the home agent if an active CoA changes. For instance, if the mobile device attaches to another mobile network (e.g., one of the networks registered as inactive, or a new mobile network) and activates this network (e.g., based on signal conditions), a CoA of the new network can be provided to the home agent, which employs this CoA to route traffic to the mobile device via the new network. If the mobile device returns to 'idle' mode, an additional binding update can be sent to the home agent to re-bind inactive CoAs to the home IP address of the mobile device. In such a manner, the mobile device can roam amongst the various networks without having to signal to the home agent or network (e.g., within mobility management limitations of each network, such as tracking area updates).

In one aspect of the subject disclosure, the mobile device can maintain a registration counter for each CoA obtained from a mobile network. The registration counter can match or be similar to a registration counter maintained by a mobile network that issues the CoA. As an example, a radio access network (RAN) for a UMTS mobile network can, upon registering the mobile device on the network, initiate a registration timer. So long as signaling between the mobile device and the network occurs, the registration timer can be reset, and the registration information for the mobile device maintained. If, however, the registration timer expires with no signaling from the mobile device (e.g., the device is powered off or leaves the RAN area), the registration can be terminated, freeing up memory and channel resources for other mobile devices. By maintaining a registration counter that matches the network's counter, a mobile device can determine whether it is still registered with the network, or whether its registration is expired. A CoA associated with an expired registration can be deleted by the mobile device, whereas a CoA associated with an active registration can be maintained at the mobile device and provided to the home agent for address binding (e.g., prior to the mobile device going into 'idle' mode, as discussed above). Thus, the mobile device can keep track of active and expired network registrations and update the home agent only with active registrations. When the home agent receives a communication for the home IP address of the mobile device, it is more likely to only initiate paging on mobile networks having an active registration for the mobile device.

According to one or more other aspects, the mobile device can attempt to signal a mobile network to maintain a CoA registration. The signaling can be based at least in part on a value of a registration counter associated with such network. For instance, if the counter is within a threshold time of expiration the mobile device can attempt to signal the network. If signaling is successful, the registration counter can be reset. Subsequent binding updates mapping CoA addresses to the mobile device's home address can include a CoA associated with the reset counter. If signaling is unsuccessful, the registration can be deleted, and a binding update sent to the home agent removing the CoA (or, e.g., the CoA can be absent from a subsequent binding update that re-registers CoAs with home address). Accordingly, a mobile device can refrain from signaling in inter-system mobility, except as required to maintain registration at one or more networks. Where registration fails, an appropriate CoA address can be deleted and removed/not updated at a serving home agent. Accordingly, minimal signaling can be required even where the mobile device 'bounces' frequently between different mobile networks, significantly reducing power consumption problems based on inter-system bouncing behavior.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process and/or thread of execution and a module can be localized on one electronic device and/or distributed between two or more electronic devices. Further, these modules can execute from various computer readable media having various data structures stored thereon. The modules can communicate by way of local and/or remote processes such as in accordance with a signal having one or more data packets (e.g., data from one component interacting with another component in a local system, distributed system, and/or across a network such as the Internet with other systems by way of the signal). Additionally, components or modules of systems described herein can be rearranged and/or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a mobile communication device (or, e.g., a mobile device). A mobile communication device can also be called a system, a subscriber unit, a subscriber station, mobile station, mobile, remote station, remote terminal, access terminal, user terminal, user agent, a user device, or user equipment. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, microcontrollers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine-readable medium and/or computer readable medium, which can be incorporated into a computer program product. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, FIG. 1 illustrates a wireless communication system 100 with multiple base stations 110 and multiple terminals 120, such as can be utilized in conjunction with one or more aspects. A base station (110) is generally a fixed station that communicates with the terminals and can also be called an access point, a Node B, or some other terminology. Each base station 110 provides communication coverage for a particular geographic area or coverage area, illustrated as three geographic areas in FIG. 1, labeled 102a, 102b, and 102c. The term "cell" can refer to a base station and/or its coverage area depending on the context in which the term is used. To improve system capacity, a base station geographic area/coverage area can be partitioned into multiple smaller areas (e.g., three smaller areas, according to cell 102a in FIG. 1), 104a, 104b, and 104c. Each smaller area (104a, 104b, 104c) can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the following description, unless specified otherwise, the term "base station" is used generically for a fixed station that serves a sector as well as a fixed station that serves a cell.

Terminals 120 are typically dispersed throughout the system, and each terminal 120 can be fixed or mobile. Terminals 120 can also be called a mobile station, user equipment, a user device, or some other terminology. A terminal 120 can be a wireless device, a cellular phone, a personal digital assistant (PDA), a wireless modem card, and so on. Each terminal 120 can communicate with zero, one, or multiple base stations 110 on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 can communicate with one another as needed. Data transmission on the forward link often occurs from one access point to one access terminal at or near the maximum data rate that can be supported by the forward link and/or the communication system. Additional channels of the forward link (e.g., control channel) can be transmitted from multiple access points to one access terminal. Reverse link data communication can occur from one access terminal to one or more access points.

Figure 2:
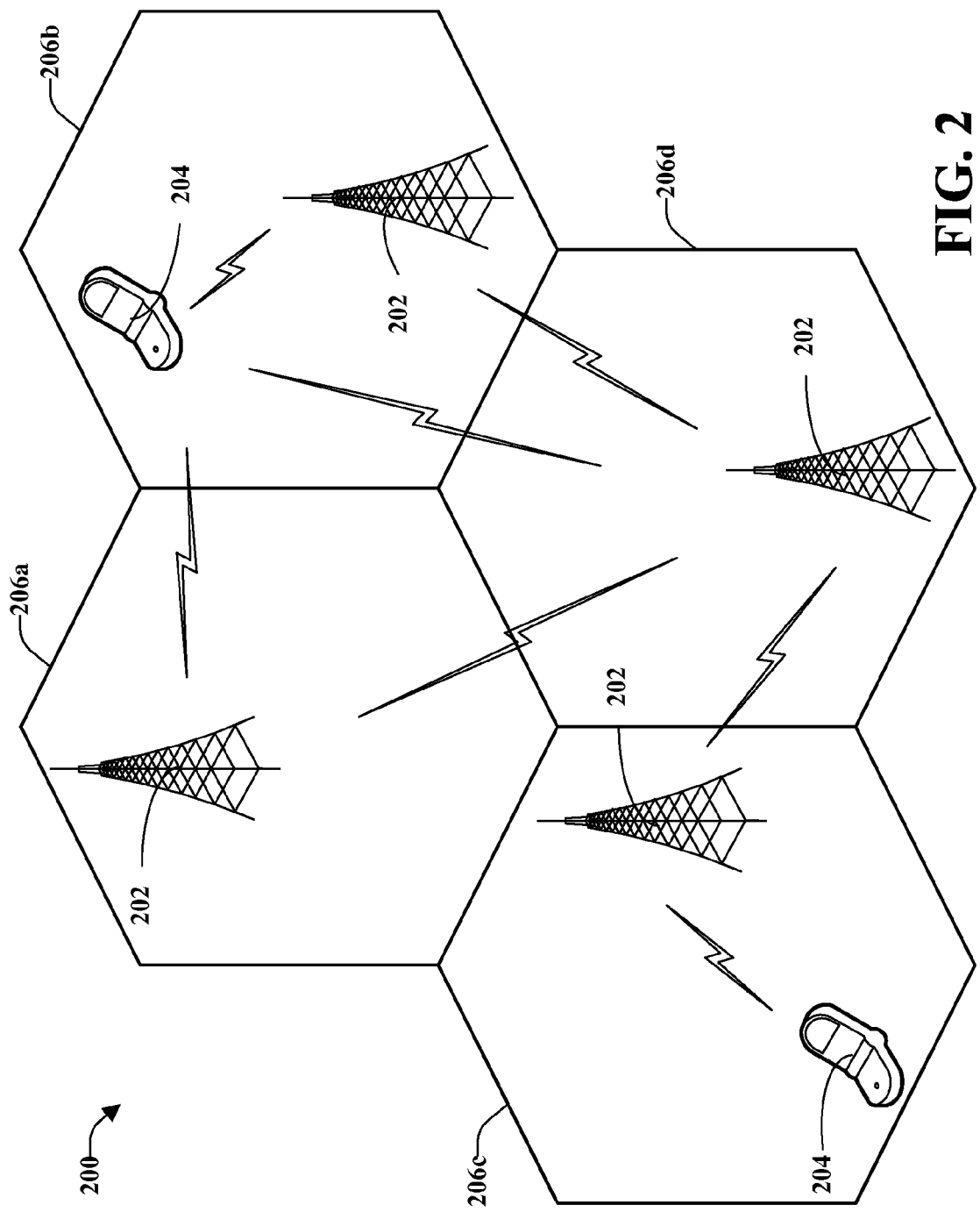
FIG. 2 depicts a block diagram of an example communication apparatus for employment with a wireless communication environment.

FIG. 2 is an illustration of an ad hoc or unplanned/semi-planned wireless communication environment 200, in accordance with various aspects. System 200 can comprise one or more base stations 202 in one or more cells and/or sectors that receive, transmit, repeat, etc., wireless communication signals to each other and/or to one or more mobile devices 204. As illustrated, each base station 202 can provide communication coverage for a particular geographic area, illustrated as four geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to facilitate providing and/or utilizing synchronized OTA message transmission in a wireless communication environment (200), as set forth herein.

Figure 3:
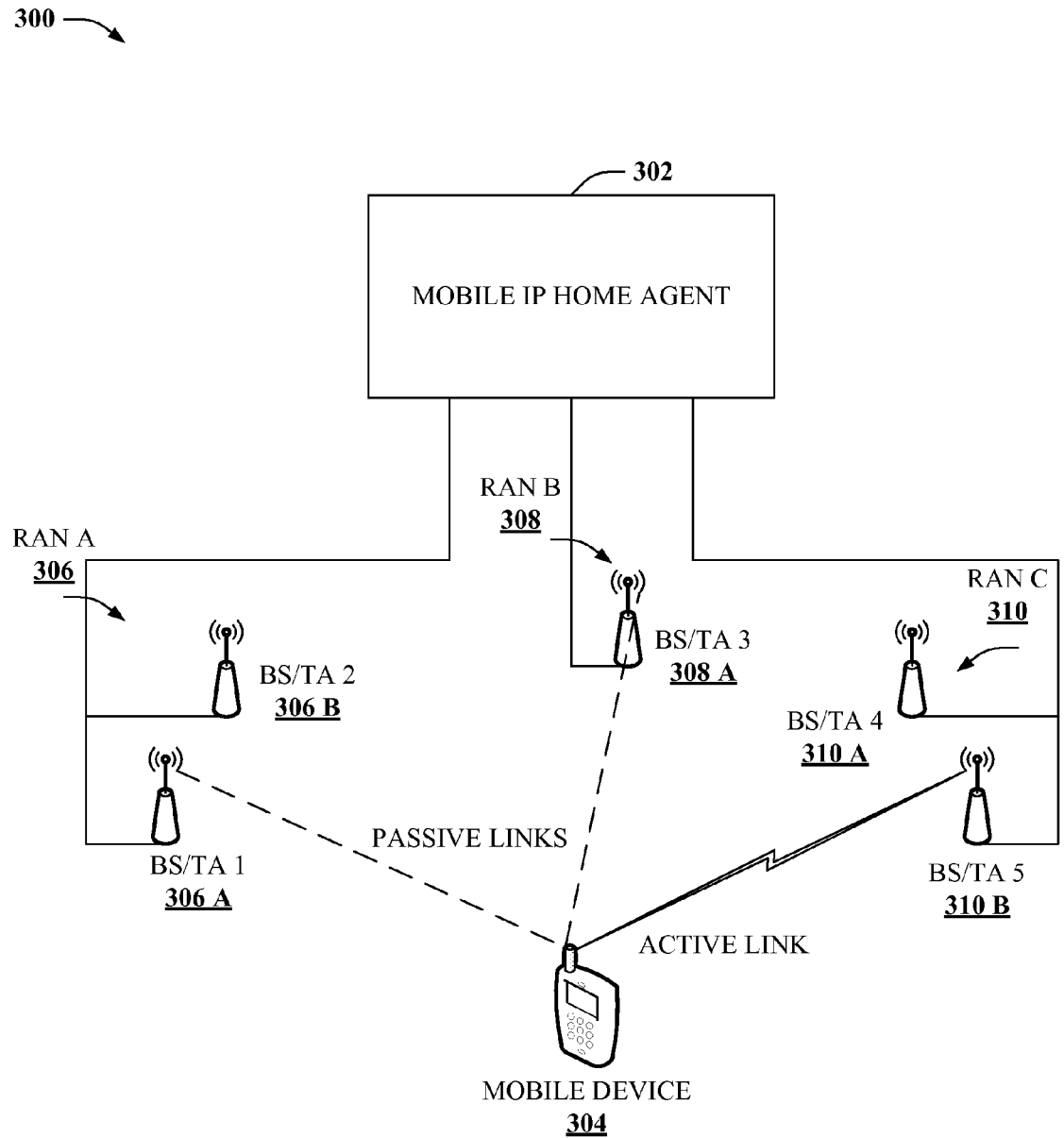
FIG. 3 illustrates a block diagram of a sample system that provides inter-system idle mobility management according to aspects described herein.

FIG. 3 illustrates a block diagram of an example system 300 that can provide inter-system mobility management according to aspects of the subject disclosure. System 300 can comprise a mobile IP home agent 302 serving at least one mobile device 304. The mobile device 304 can be a multi-mode device (e.g., having multiple wireless communication interfaces or chipsets) wirelessly coupled with base stations (306A, 306B, 308A, 310A, 310B) of various radio access networks (RANs) (306, 308, 310). The base stations 306A, 306B, 308A, 310A, 310B can serve at least one tracking area for an associated RAN 306A, 308A, 310B. (The base stations will be termed base station/tracking area, or BA/TA hereinafter for system 300). The RANs 306, 308, 310 can be associated with mobile networks that track mobility of the mobile device 304 independently of each other. In such an environment, system 300 provides for reduced mobile device signaling, preserving battery life, reducing inter-device (304) interference, and increasing overall efficiency of multi-system (300) mobile communications.

In one or more aspects, system 300 can employ multiple address binding at the home agent 302 to facilitate tracking the mobile device in multiple networks 306, 308, 310. Furthermore, the tracking can be implemented with little or no signaling on the part of the mobile device 304 in many circumstances. As an example to illustrate the foregoing concept, mobile device 304 registers with each RAN 306, 308, 310 and obtains a distinct CoA from each RAN 306, 308, 310. The CoAs are provided to home agent 302, which binds the CoAs to a home IP address associated with the mobile device 304. If an incoming communication is received at the home agent 302 for the mobile device 304, the communication is forwarded to at least a plurality of the RANs 306, 308, 310 (e.g., all of the RANs 306, 308, 310, RANs 306, 308, 310 listed as active, or the like). The RANs 306, 308, 310 can then page the mobile device 304 to deliver the communication. Accordingly, system 300 need not know exactly which RAN 306, 308, 310 that mobile device 304 is attached to at any given point in time. Accordingly, the mobile device 304 can switch between the RANs 306, 308, 310 with little or no network signaling, significantly reducing power consumption in the inter-system mobile environment (300).

To facilitate efficient data communication, mobile device 304 can update the home agent 302 with a selected active CoA when mobile device 304 receives a page from a network (306, 308, 310). Where the device 304 receives a page from multiple such networks (306, 308, 310), one network can be selected as active based on signal quality, bandwidth, interference, or like channel characteristics. Thus, if mobile device 304 is attached to only one of the three RANs 306, 308, 310 with which the mobile device 304 has an active registration (e.g., RAN C 310, by way of BS/TA 5 310B, indicating by the solid wireless link), the mobile device 304 can send a binding update to the home agent 302 indicating that RAN C 310 is an active network. Accordingly, home agent 302 can delete CoAs associated with RAN A 306 and RAN B 308 (or, e.g., set these CoAs to an inactive state, or distinguish them from RAN C 310 in some other suitable manner). Subsequent communication associated with mobile device 304 will be routed by home agent 302 through RAN C 310, at least until the home agent 302 obtains a new binding update from the mobile device 304.

As discussed above, mobile device 304 can switch from one RAN 306, 308, 310 to another without having to signal the home agent 302. If the mobile device 304 moves from one BS/TA 306A, 306B, 308A, 310A, 310B to another, it typically will signal associated networks to update a tracking area location(s) of the device 304 for such network(s) 306, 308, 310. For instance, if mobile device 304 registers with BA/TA 1 306A and subsequently receives synchronization information from BS/TA 2 306B, the mobile device can signal RAN 1 306 and register into BS/TA 2 306B instead. If a new CoA is obtained from RAN A 306 as a result of the new tracking area registration, this new CoA can be provided to home agent 302 (otherwise, a previous CoA provided by RAN A 306 can be maintained). However, switching from RAN A 306 to RAN B 308 or RAN C 310 does not require additional signaling, so long as the mobile device maintains a consistent tracking area relative to such networks 306, 308, 310.

If an active communication involving mobile device 304 terminates, the mobile device can return to an 'idle' state to preserve power. In order to maintain a multiple binding at the home agent 302, mobile device 304 can initiate another binding update including CoAs of networks (306, 308, 310) that were deleted or de-activated by the home agent 302. For example, mobile device 304 receives a page from RAN C 310. The mobile device 304 can update home agent 302 indicating that a CoA provided by RAN C 310 should be utilized to forward traffic to the mobile device 304. CoAs associated with other networks (e.g., RAN A 306 and/or RAN B 308) are deleted or de-activated by home agent 302 as discussed above. In order to maintain inter-system mobility, such that home agent 302 can initiate paging for mobile device 304 on multiple systems, the deleted/de-activated CoAs can be re-sent by the mobile device 304 to home agent 302. Mobile device 304 can then enter an 'idle' state, and simply monitor inbound synchronization information (e.g., to identify changes in network tracking area) and paging information (e.g., to identify inbound calls).

Figure 4:
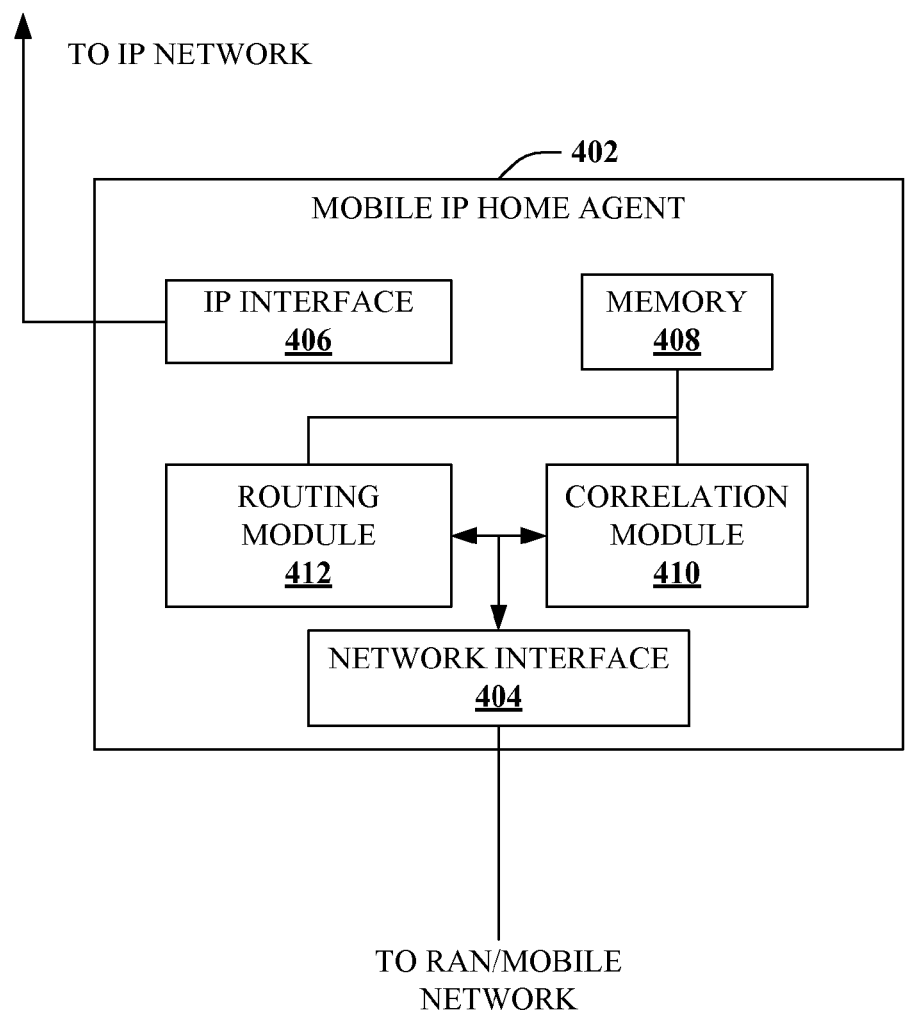
FIG. 4 depicts a block diagram of an example system comprising an IP home agent according to aspects of the subject disclosure.

FIG. 4 depicts a block diagram of an example system 400 comprising an IP home agent 402 according to aspects of the subject disclosure. The IP home agent 402 can provide IP routing for one or more mobile devices (not depicted). The IP routing can include binding multiple system addresses provided by multiple mobile networks to a home IP address associated with the mobile devices. In addition, home agent 402 can employ the multiple bindings to implement inter-system idle mobility.

Home agent 402 can comprise a network interface 404 that obtains data initiated by a mobile device. Such data can include multiple MIP bindings (e.g., system CoAs) for the mobile device, and can be stored in memory 408 at the home agent 402. Home agent 402 can further comprise an IP interface 406 that provides communication with an IP network, such as the Internet, via an Internet Service Provider (ISP). The IP interface 406 and network interface 404 can enable the home agent 402 to serve as an IP proxy for mobile devices coupled with the home agent 402 via one or more mobile networks.

In addition, mobile IP home agent 402 can comprise a correlation module 410 that maps a system address for each of multiple MIP bindings provided by a mobile device(s) to a home IP address for such device(s). The map correlating the MIP bindings to the home IP address can be stored and referenced at memory 408. A system address identifies a mobile network coupled to the mobile device, enabling the home agent 402 to forward communication to the mobile device by way of such mobile network. By binding multiple system addresses to the home IP address, the home agent 402 can attempt to forward communication to the mobile device by way of any suitable mobile network associated with the multiple system addresses.

In addition to the foregoing, home agent 402 can comprise a routing module 412 that can employ a plurality of the MIP bindings mapped to the home IP address of a mobile device to forward IP traffic from the IP network to such device. For instance, when data communication routed to a particular home IP address is received, routing module 412 can reference the MIP bindings mapped to the home IP address and identify mobile networks that are potentially coupled with the mobile device. The routing module 412 can forward the received data, or a portion thereof, to at least a plurality of the identified mobile networks to notify the mobile device of the received communication. In at least one aspect, the home agent 402 can forward a packet communication to all mobile networks associated with a system address bound to the home IP address. Accordingly, such networks can initiate paging routines to facilitate completion of the packet communication.

Figure 5:
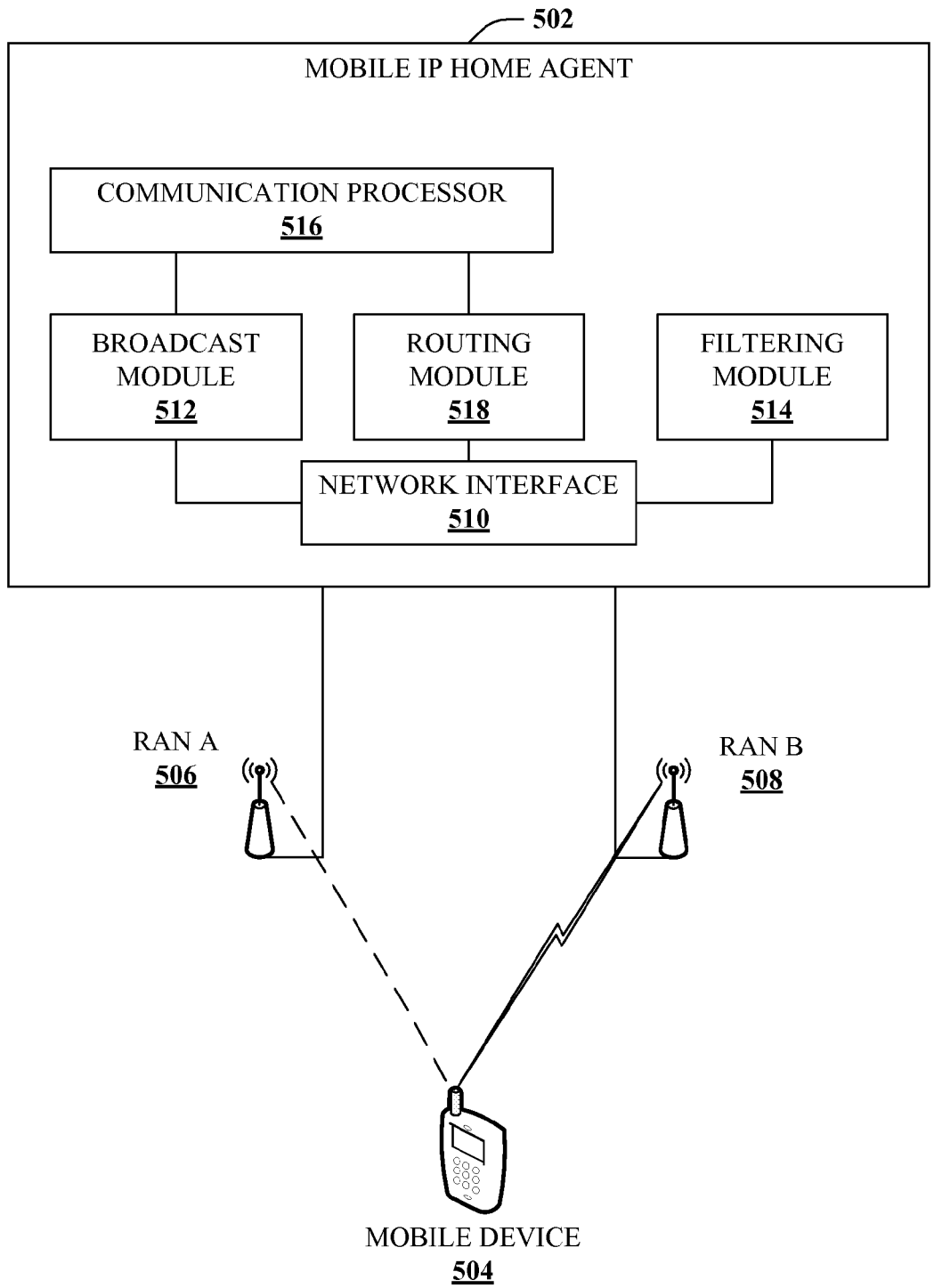
FIG. 5 illustrates a block diagram of an example system that provides inter-system idle mobility management according to further aspects.

FIG. 5 illustrates a block diagram of an example system 500 that provides inter-system idle mobility management according to further aspects. System 500 can comprise a mobile IP home agent 502 communicatively coupled with a plurality of mobile access networks, RAN A 506 and RAN B 508. The RANs 506, 508 provide wireless communication for at least one mobile device 504. As discussed elsewhere in the subject disclosure, the home agent 502 can map multiple system addresses to a home IP address of the mobile device 504, and route received data communications to at least a plurality of mobile networks (506, 508) associated with the system addresses. In addition, home agent 502 can obtain information identifying an active network and/or system address associated with the mobile device 504. Subsequent portions of the data communication can be forwarded via the active network instead of other networks. Accordingly, system 500 can minimize network paging resources of the other networks by refraining from forwarding the subsequent portions of the communication by such networks.

Home agent 502 can comprise a network interface 510 that facilitates data communication with the RANs 506, 508. Home agent 502 can act as an IP proxy for mobile device 504, forwarding data to an IP network for the device 504 and receiving data from such network for the device 504. A broadcast module 512 can employ the network interface 510 to multicast at least a portion of a received packet communication to a plurality of access gateways of the RANs 506, 508. A MIP binding between system addresses associated with RANs 506, 508 and a home IP address identified by the received packet communication can enable home agent 502 to identify the appropriate access gateways. The RANs 506, 508 can initiate a paging routine for the mobile device 504, comprising broadcast wireless signals. If mobile device 504 receives the wireless signals, it can 'wake up' from an idle mode and send a response to at least one network 506, 508. The response can indicate that the mobile device 504 is ready to receive the communication, for instance. In at least one aspect, the response can include a binding update (e.g., including a CoA of the active network) to be forwarded to home agent 502. Where mobile device 504 receives paging signals from multiple networks 506, 508, the device 504 can select between the networks (e.g., based on a quality of the received signals) to receive the communication and respond to the selected network.

By responding to a particular network 506, 508, the mobile device establishes such network as an active network. A binding update forwarded to home agent 502 can identify this active network. Specifically, the binding update can be sent by the mobile device 504 to an active network (e.g., RAN B 508), which can be forwarded to home agent 502. A filtering module 514 can distinguish the active network from other networks bound to the home IP address of the mobile device 504. In one aspect of the subject disclosure, the binding update can include a CoA assigned to the mobile device 504 by the active network (e.g., 508). Upon receiving the binding update at network interface 510, a filtering module 514 can compare the active network's CoA to system addresses bound to the home IP address, and identify the active network. To mitigate use of paging resources of non-active networks (e.g., 506) involved in multicasting received communications to multiple networks, filtering module 514 can update MIP addresses bound to the mobile device's home address (e.g., the filtering module can delete, de-activate, etc., non-active CoAs mapped to the home IP address). Routing module 518 can then provide subsequent data communication addressed to the mobile device 504 by way of the active network only, allowing non-active networks to re-associate channel resources to other activity.

Figure 6:
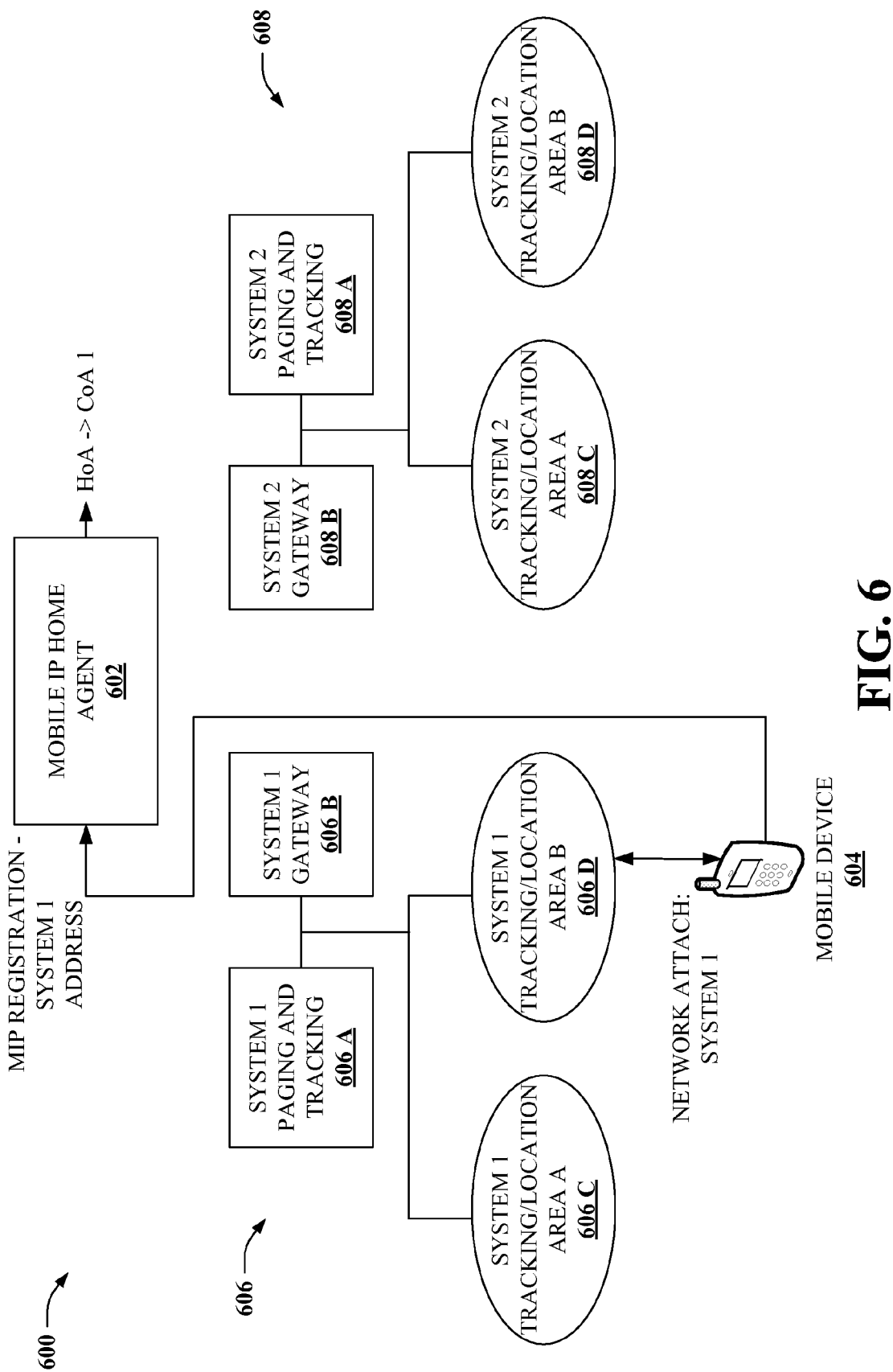
FIG. 6 depicts a block diagram of an example inter-system mobile registration according to some aspects.
Figure 7:
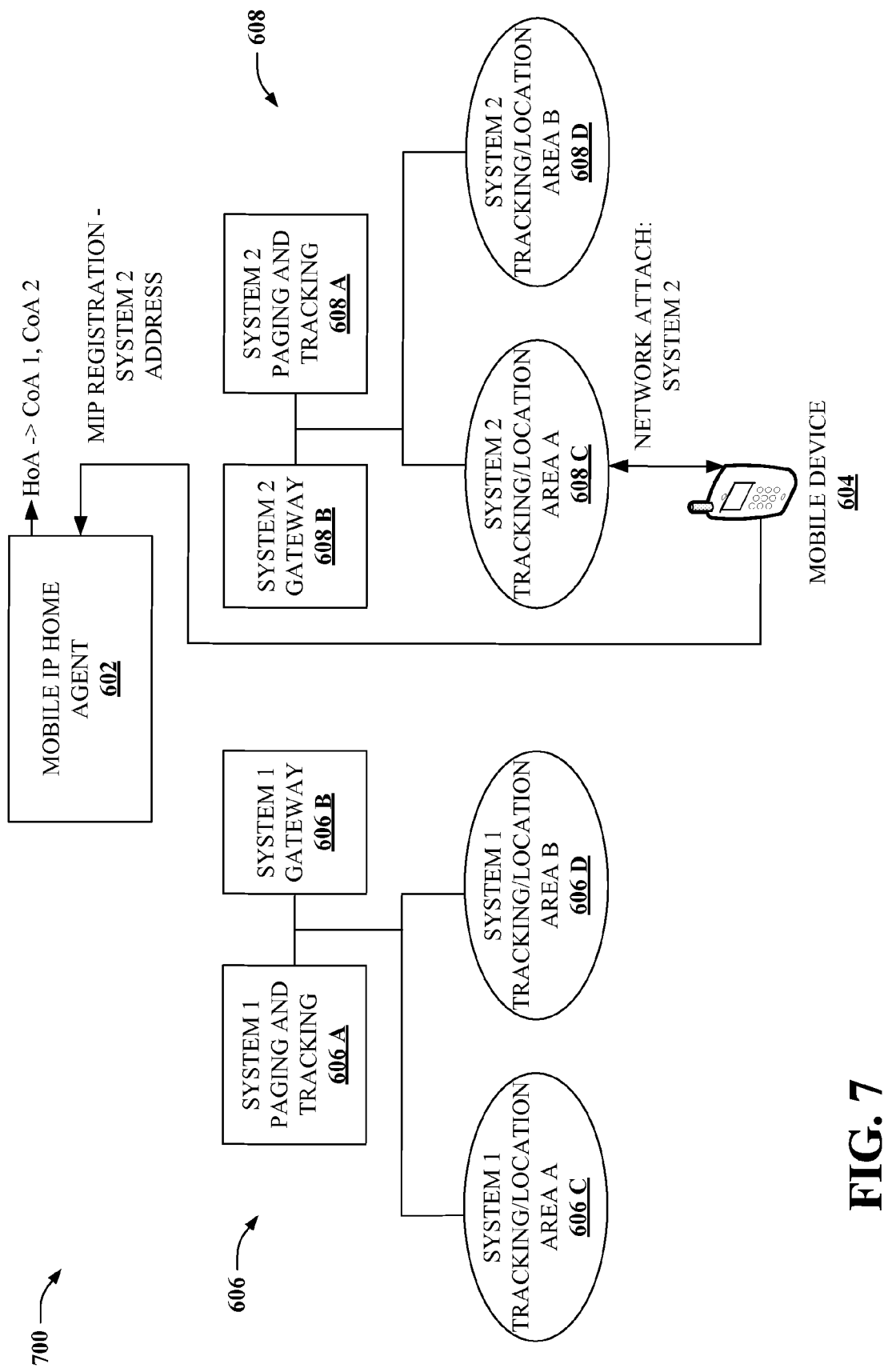
FIG. 7 depicts a block diagram of an example multi-system mobile registration according to further aspects.
Figure 8:
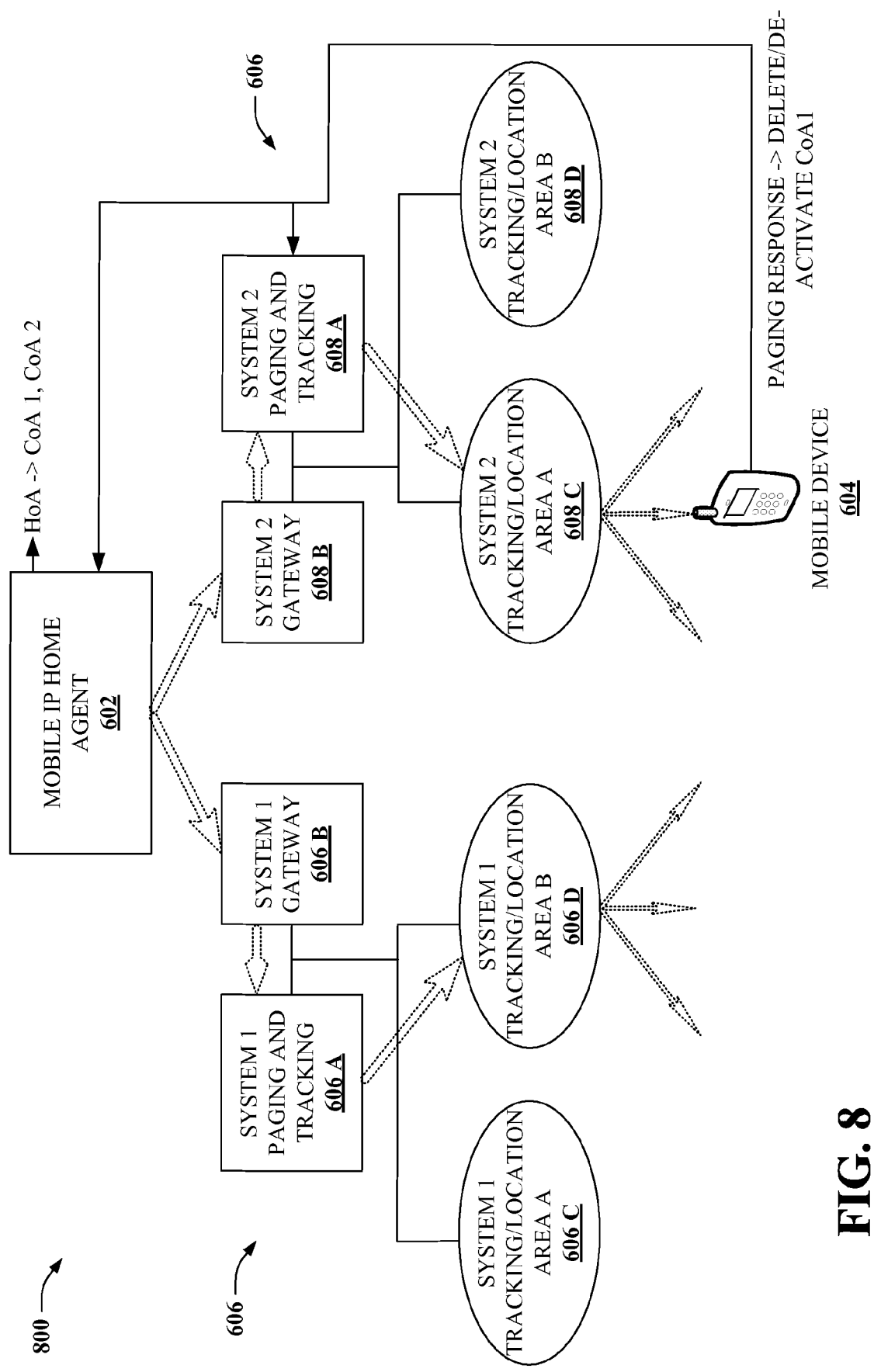
FIG. 8 illustrates a block diagram of a sample multi-system paging event for a multi-system mobile registration according to one or more aspects.

FIGS. 6, 7, and 8 depict block diagrams 600, 700 and 800 providing an example of inter-system idle mobility management in accordance with one or more aspects of the subject disclosure. Diagram 600 includes a mobile IP home agent 602 that provides IP service for at least one mobile device 604. The home agent 602 can communicatively couple with two or more wireless access networks 606, 608 that provide wireless data exchange with the mobile device 604. Location of the mobile device 604 is maintained independently by each network 606, 608, based on wireless communication between the device 604 and base stations (not depicted) associated with one or more tracking/location areas 606C, 606D, 608C, 608D. In many circumstances the mobile device 604 must signal a network (606, 608) when the device 604 moves from one tracking area 606C, 606D, 608C, 608D to another, as well as when the device 604 switches an active network from a first network to another. As described herein, however, the mobile device 604 can obviate the need for signaling at least when changing active networks, by updating the home agent with system addresses (or CoAs) associated with both such networks (606, 608).

As depicted by diagram 600, mobile device 604 performs a network attach with a first access network 606 at a tracking/location area B 606D of such network. The first network 606 can provide a CoA (e.g., CoA 1) to the device 604 to distinguish mobile device 604 from other such devices (not depicted) and forward communication intended for the mobile device 604 to an appropriate tracking/location area (606C, 606D). Mobile device 604 can perform a binding update, requesting the access network 606 forward CoA 1 to home agent 602. Home agent 602 receives CoA 1 and then binds the CoA 1 to a home address (HoA) associated with mobile device 604. Thus, information received by home agent 602 routed to the home address can be forwarded at least to the first network 606 as indicated by the CoA 1.

It should be appreciated that in at least one aspect access networks 606 and 608 comprise different mobile communication architectures and/or access methods or the like, such that device mobility information maintained at the first network 606 is not available to the second network 608, and vice versa. For instance, network 606 can be a GSM network whereas network 608 is a code division multiple access (CDMA) network. As another example, the first network 606 can be a 2G circuit-switched voice network (e.g., GSM, CDMA, time division multiple access [TDMA]), and the second network 608 can be a third generation (3G) data and voice network, or a fourth generation (4G) or pre-4G data-only or similar network (e.g., worldwide interoperability for microwave access [WiMAX], ultra mobile broadband [UMB], UMTS long term evolution [LTE]), and so on. It also is to be appreciated that in such aspects mobile device 604 is configured to communicate with at least two such networks of differing architecture (e.g., by way of a multi-mode chipset).

At FIG. 7, a block diagram 700 is illustrated that illustrates attachment by the mobile device 604 to a second access network 608. Specifically, mobile device 604 can attach to the second wireless access network 608 at a tracking/location area A 608C of such network 608. A second CoA is provided by the second network 608, CoA 2, which is forwarded via a binding update to home agent 602. The home agent then binds the home address of the mobile device 604 with CoA 2 in addition to CoA 1. Accordingly, home agent 602 can associate the mobile device with at least two networks 606, 608 simultaneously. Thus, regardless of whether the mobile device 604 is attached to/active on the first network 606 or the second network 608, home agent 602 has a means to forward data communications to such device 604.

It should be appreciated that tracking/location areas (608C, 608D) of the second network 608 can overlap geographically with tracking/location areas (606C, 606D) of the first network 606. Accordingly, mobile device 604 can remain in a single tracking/location area with respect to each network (e.g., 606D with respect to network 606 and 608D with respect to network 608), independent of the other network (606, 608). In addition, the device 604 can move from a first tracking area to a second with respect to one network (e.g., 606) but remain in a single area with respect to another network (e.g., 608). Further, network 606 need not have information as to a status of mobile device 604 with respect to network 608, and vice versa. In spite of the independence of the networks, mobile device 604 need not signal either network as long as it remains within a common tracking area with respect to the networks. Further, if the mobile device 604 moves from system 2 tracking/location area A 608C to system 2 tracking/location area B 608D, but remains in system 1 tracking/location area B 606D, the mobile device 604 can signal network 2 but need not signal network 1 (except, for instance, to prevent expiration of a registration timer maintained by system 1, see FIG. 9, infra).

FIG. 8 illustrates a block diagram 800 of a multicast paging event initiated by the home agent 602 to forward received data communication to mobile device 604. Specifically, home agent 602 receives data identifying a home address of the mobile device 604. By referencing the MIP binding associated with the home address, home agent 602 can identify CoA 1 associated with the first network 606 and CoA 2 associated with the second network 608. To forward the data to the mobile device 604, home agent 602 provides the received data, a portion thereof or information related thereto, to a system 1 gateway 606B and a system 2 gateway 608B. The network gateways (606B, 608B) initiate paging routines at the respective networks 606, 608 via paging and tracking systems 606A, 608A. The paging and tracking systems 606A, 608A reference network registration information pertinent to the mobile device 604 and determine a last known location/tracking area (606D, 608C) for such device 604. The appropriate location/tracking areas 606D, 608C each broadcast paging signals indicating that an incoming call is received for mobile device 604. Accordingly, as long as mobile device 604 is operating normally and still within either system 1 tracking/location area B 606D or system 2 tracking/location area A 608C, it should receive one or more paging signals.

As depicted at diagram 800, mobile device 604 receives paging signals (dotted arrows) from system 2 tracking/location area A 608C. Upon processing the received signals in idle mode, mobile device 604 can terminate 'idle' mode to receive the incoming call. The device 604 can respond to one or more networks 606, 608 to become active on such networks (e.g., the second network 608). Device 604 can be configured to provide information to home agent 602 suitable to identify the active network (608). In one aspect, the information can comprise the CoA associated with the active network (e.g., CoA 2). In another aspect, the information can comprise a CoA of the inactive network(s) (e.g., CoA 1). In at least one other aspect, the information can comprise the CoA of the active network and inactive network(s), and distinguish the active CoA and/or inactive CoAs.

Once home agent receives the binding update, a CoA of the active network is determined. The address binding, HoA→CoA 1, CoA 2, is updated based on such determination. For instance, the inactive address can be deleted, deactivated, or the like, such that subsequent communication addressed to the home address is forwarded only to the active network. After updating the address binding, home agent 602 refrains from sending any additional information to inactive networks (606) to preserve channel resources of such networks. In at least one aspect, home agent 602 can send a message to an inactive network (606) indicating that the forwarded message is to be terminated at the inactive network. Accordingly, network 606 can discard data received for the mobile device 604.

In at least one additional aspect of the disclosure, networks 606 and 608 can be configured to not delete a CoA of a mobile device 604 if the device (604) fails to respond to a paging event. Accordingly, the inter-system mobility, where home agent 602 utilizes a plurality of networks 606, 608 to deliver data to mobile device 604, can be maintained despite a failed paging event. Accordingly, in the above-described scenario, the first network 606 will maintain the CoA 1 associated with the mobile device 604, despite the fact that a paging response is not received at system 1 tracking/location area B 606D. Instead, the first network 606 can maintain a registration counter for mobile devices that are registered on such network 606, and delete a CoA when the registration counter expires. Thus, the address binding maintained at the home agent 602 can remain valid at least as long as network registration counters associated with bound MIPs are maintained by respective networks.

Figure 9:
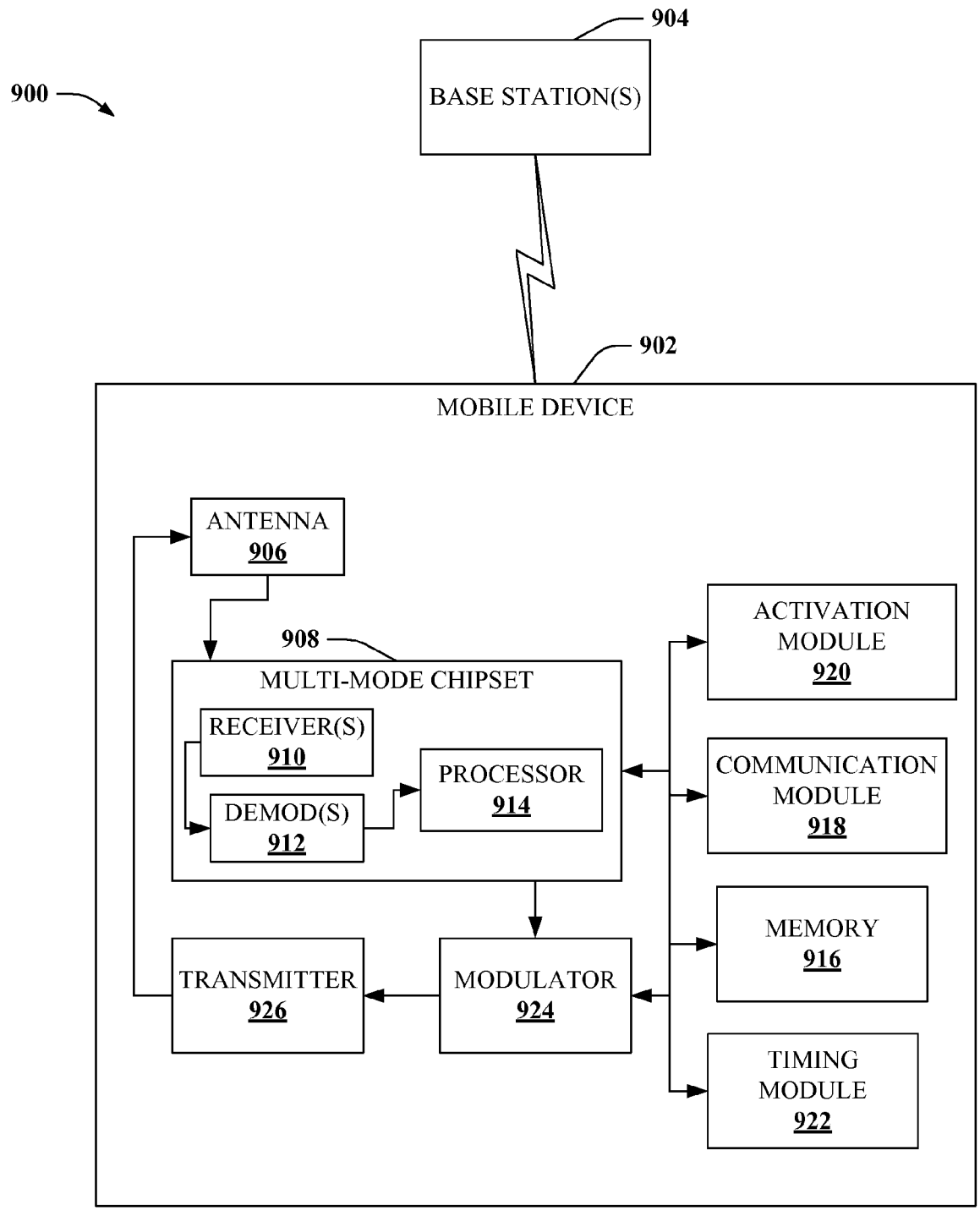
FIG. 9 depicts a block diagram of an example mobile device in accordance with further aspects.

FIG. 9 illustrates a block diagram of an example system 900 that comprises a mobile device 902. Mobile device 902 can be configured to wirelessly couple with one or more base stations 904 associated with different mobile networks, different network architectures (e.g., 2G, 3G, 3GPP, 3GPP2, pre-4G, 4G, and so on), different network access technologies (e.g., frequency division multiplex [FDM], orthogonal frequency division multiplex [OFDM], orthogonal frequency division multiple access [OFDMA], CDMA, TDMA, and/or the like), and so on, by way of a multi-mode chipset 908. The multi-mode chipset 908 can contain various receivers 910, demodulators 912 and processors 914 suitable to communicate with the various mobile networks and/or network architectures and access technologies, as known in the art.

Mobile handset 902 includes at least one antenna 906 (e.g., a transmission receiver or group of such receivers comprising an input interface) that receives a signal (e.g., a paging event transmitted by base station 904 utilizing a system address assigned to mobile handset 902) and receiver(s) 910, which performs typical actions (e.g., filters, amplifies, down-converts, etc.) on the received signal. According to at least some aspects, processor(s) 914 can analyze signals received from demodulator(s) 912 and obtain system IP addresses assigned by mobile networks wirelessly coupled with mobile handset 902 from the analyzed signals (e.g., such system IP addresses can be associated with networks that independently manage device mobility according to at least some aspects). In general, antenna 906 and transmitter 930 (collectively referred to as a transceiver) can be configured to facilitate wireless data exchange with base station(s) 904.

Antenna 906 and receiver(s) 910 can also be coupled with the demodulator(s) 912 that can demodulate received symbols and provide them to the processor(s) 914 for evaluation. It should be appreciated that processor(s) 914 can control and/or reference one or more components (906, 910, 912, 916, 924, 926) of the mobile handset 902. Further, processor (s) 914 can execute one or more modules, applications, engines, or the like (918, 920, 922) that comprise information or controls pertinent to executing functions of the mobile handset 902. For instance, such functions can include entering/leaving 'idle' mode, receiving data from a remote source (904), decoding the received data to identify incoming communications for the mobile handset 902, extracting network routing information (e.g., one or more system addresses, or CoAs) from the received data, forwarding the routing addresses to a network IP agent serving the mobile device, maintaining registration counters for CoAs issued by multiple networks (904), or the like, as described herein.

Mobile handset 902 can additionally include memory 916 that is operatively coupled to processor(s) 914. Memory 916 can store data to be transmitted, received, and the like, and instructions suitable to conduct wireless communication with a remote device (904). Further, memory 916 can store the modules, applications, engines, etc. (918, 920, 922) executed by processor(s) 914, above.

According to some aspects, processor(s) 914 can obtain multiple system IP addresses from various mobile networks, as mentioned above. The processor(s) 914 can further comprise at least one transmission processor, that employs modulator 928 and transmitter 930 to provide one or more of the multiple system IP addresses to a network routing device (not depicted) via base station(s) 904. The routing device can be selected based on a configuration that binds the multiple IP addresses to a home address IP address maintained for the mobile handset 902. Additionally, mobile handset can comprise an activation module 920 that updates the network routing device (e.g., via processors 914, modulator 928 and transmitter 930) to identify one of the multiple addresses as an active address. The active address can be selected by a communication module 918, which can base the selection on signal characteristics of received signals (e.g., signal strength, signal interference, peak to average power ratio, and so on) associated with the system addresses (e.g., received signals that contain the system addresses).

According to still other aspects, processor(s) 914 can activate voice and/or data communication with a particular network (904) based on a paging event received at antenna 906. For instance, the processor(s) 914 can determine that the paging event indicates an incoming communication for mobile handset 902. Thus, activating communication with a paging network (904) can facilitate routing the communication (e.g., by a network routing agent) to the handset 902 via base station(s) 904 (associated with the activated network).

In addition to the foregoing, because network signal quality can change and/or become too remote to effectively receive, mobile handset 902 can be configured to switch an active network from a first network to a second network. Thus, communication module 918 can monitor characteristics of received signals and compare the characteristics to one or more thresholds. Where the characteristics (e.g., signal strength, interference, etc.) drop below the thresholds for one set of signals associated with the first network and another set of signals associated with the second network rise above the thresholds, communication module 918 can activate a CoA associated with the second network. The activation module can send a binding update to the network routing device that includes the newly activated CoA. Accordingly, antenna 906, receiver(s) 910, and processor(s) 914 will begin to receive subsequent data packet communications routed by the network routing device via the newly activated CoA.

When an incoming call terminates, mobile handset 902 can return to an idle mode, where multi-mode chipset 908 conserves power by processing only a fraction of information received by antenna 906 (e.g., where the fraction of information can comprise synchronization information identifying a tracking/location area of a mobile network and/or paging information identifying inbound communication). In order to re-establish the inter-system mobility tracking prior to entering idle mode, activation module 920 can send a transmission to the base station(s) 904 containing a binding update for the routing agent associated with mobile handset 902. The binding update can include CoAs that were deleted/de-activated at the routing agent (optionally based on a condition that a registration counter associated with each such CoA is not expired, see below). The routing agent therefore can re-bind the deleted/de-activated CoAs to a home address of the mobile handset 902 to facilitate further communication.

According to one or more additional aspects, mobile handset 902 can further comprise a timing module 922. Timing module 922 can maintain a registration counter for a CoA provided by a particular mobile network (904). In some aspects, the CoA can be an inactive CoA that mobile handset 902 is not currently attached to. In other aspects, the timing module 922 can maintain the registration counter for each CoA obtained by the mobile handset 902 from a different mobile network. Furthermore, the registration counter(s) can match a similar counter maintained by the respective mobile networks, utilized to maintain registration of mobile handset 902 with each such network. When the registration counter maintained by a network expires, the registration for mobile handset 902 is deleted, requiring re-attachment (and associated signaling) to further communicate with that network. By maintaining similar registration counters at mobile handset 902, timing module 922 can determine whether a CoA is still registered by a providing network, and how long such registration will continue.

In addition to the foregoing, timing module 922 can initiate a signal to a base station (904) associated with a particular network if a registration counter pertaining to such network is within a threshold period of expiration. By signaling the network, the registration counter maintained by the network can be refreshed, ensuring that a CoA provided by such network remains active for an additional period of time. Mobile handset 902 can determine validity of CoA addresses bound to a home address of the handset 902 by a network routing agent via the registration counters maintained by the timing module 922. If timing module 922 is unable to signal a network to refresh a registration counter, a matching counter maintained by timing module 922 and associated CoA can be cancelled by mobile device 902 upon expiration of the counter. Activation module 920 can send a binding update to the routing entity requesting deletion of the expired CoA. Thus, mobile handset 902 can manage active/inactive/expired CoAs by way of wireless communications with base station(s) 904.

Figure 10:
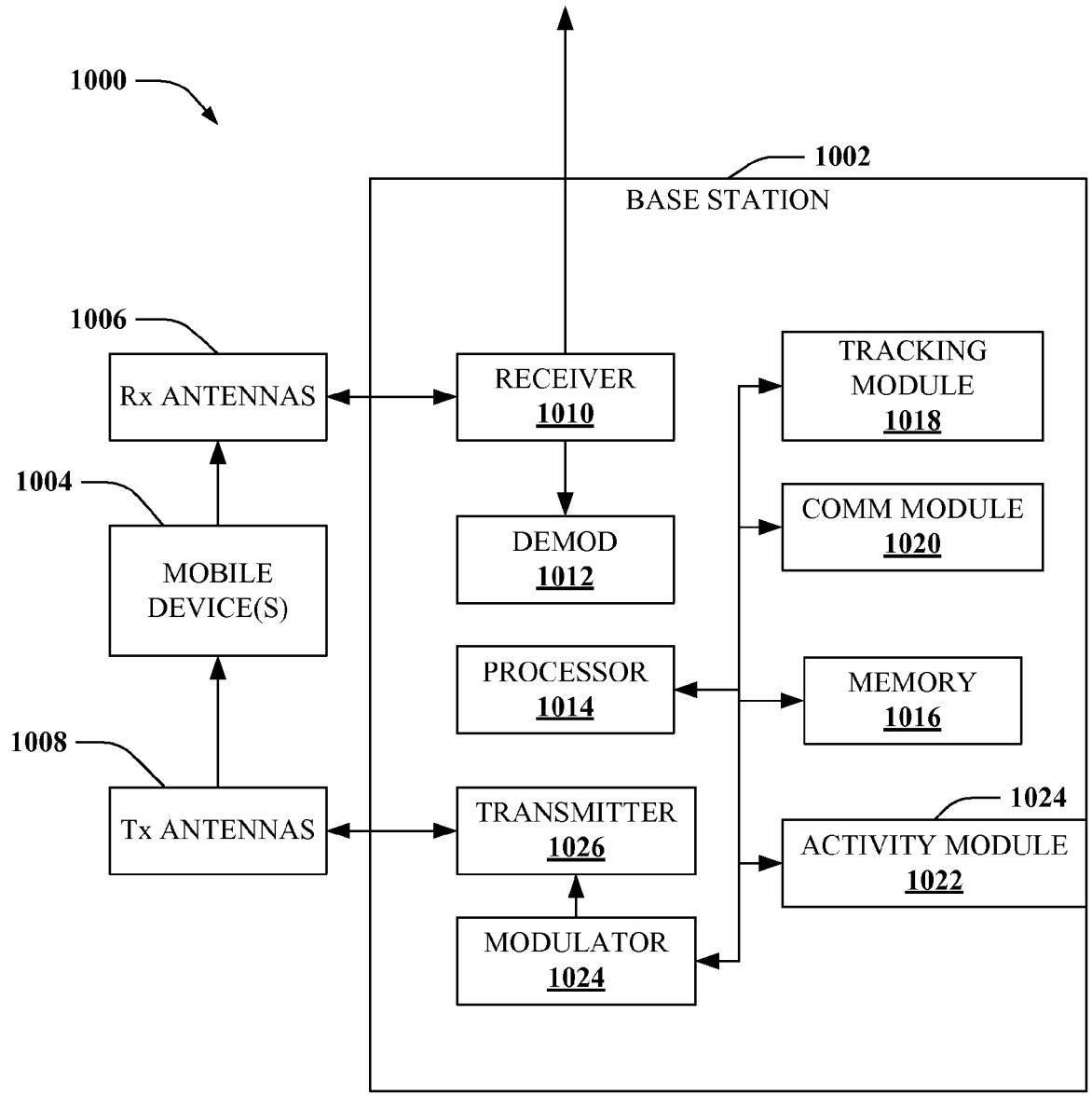
FIG. 10 illustrates a block diagram of a sample radio access network base station that facilitates inter-system mobility management.

FIG. 10 depicts a block diagram of an example system 1000 comprising a base station 1002 and one or more mobile devices 1004 according to aspects of the subject disclosure. In at least one aspect of the subject disclosure, base station 1002 can provide a distinct CoA to one or more mobile devices 1004, generating by a serving mobile network to facilitate data communications local to such network. Furthermore, base station 1002 can provide paging functions for the mobile network with respect to mobile devices 1004 within a geographic area served by the network (e.g., see FIGS. 1 and 2). The base station 1002 can continue broadcasting paging signals until a response is received by a target mobile device, a paging termination command is received from the mobile network, or an expiration timer maintained by the base station 1002 expires, or a combination thereof. In accordance with particular aspects, base station 1002 can maintain a registration counter for the mobile device with respect to a tracking/location area served by the base station 1002. Further, the registration counter can be maintained even though a mobile device fails to respond to a paging event. Accordingly, system 1000 facilitates inter-system mobility by paging devices 1004 independently of other systems (not depicted), and maintaining device registration in spite of a failed paging response (e.g., where the mobile device responds to the other system's page).

Base station 1002 (e.g., access point, . . . ) can comprise a receiver 1010 that receives signal(s), and over-the-air (OTA) messages from one or more mobile devices 1004 through a plurality of receive antennas 1006, and a transmitter 1026 that transmits OTA messages to the one or more mobile devices 1004 through a transmit antenna(s) 1008. Receiver 1010 can receive information from receive antennas 1006 and can further comprise a signal recipient (not shown) that receives uplink data transmitted by mobile device(s) 1004. Additionally, receiver 1010 is operatively associated with a demodulator 1012 that demodulates received information. Demodulated symbols are analyzed by a processor 1014 that is coupled to a memory 1016 that stores information related to functions provided by base station 1002. In one instance, stored information can comprise protocols for paging and receiving paging responses from mobile devices 1004. Particularly, the stored information can comprise rules for maintaining network registration for such devices 1004, despite not receiving a response to a page. In at least one aspect, the information can relate to maintaining a registration counter for devices 1004 registered with one or more mobile networks, and matching a status of the registration to a status of the registration counter.

Processor 1014 is further coupled to a tracking module 1018 that can register the mobile device with a mobile network associated with base station 1002. A communication module 1020 can employ a transceiver (1010, 1026) of the base station 1002 to page mobile devices substantially within a location area served by the base station 1002. Furthermore, an activity module 1022 can set a state for the paged mobile device 1004 to idle with respect to the location area if no response to the page is received. It should be appreciated that the idle mode does not cancel registration of mobile device 1004 with the mobile network. Accordingly, as discussed above, base station 1002 can maintain such registration even where no response to a page is received.

In at least one aspect, tracking module 1018 can maintain a location area update timer for each mobile device 1004 (optionally, the base station 1002 can maintain at least one location update timer for each mobile network served by the base station 1002, where the base station 1002 provides wireless access to more than one network). The update timer can be maintained for a threshold period of time after registering the mobile device with a mobile network. Furthermore, tracking module 1018 can refresh the timer upon receiving suitable signaling from the registered mobile device 1004. If the update timer expires, the registration can then be deleted, and thus data received at the base station 1002 addressed to such registration can be ignored.

According to further aspects, signals received from the mobile device 1004 can be referenced against a location update timer associated with such device 1004. Referencing the update timer can aid in properly processing such signals and/or registering the device 1004. Thus, if antenna 1006 and receiver 1010 obtain a signal initiated by the particular mobile device 1004, activity module 1022 can reference the update timer. If the timer is not expired, a state of the mobile device can be set to active based on the received signal. If the timer is expired, activity module 1022 can initiate re-registration of the mobile device 1004 with a target mobile network. Thus, by maintaining a registration counter for mobile devices 1004, and establishing an active/idle/expired registration state for such devices 1004 based on the counter rather than paging responses (or lack thereof), multi-system paging can be conducted by a network device (e.g., a home IP agent serving a mobile device 1004) without terminating the inter-system relationship. This allows mobile devices 1004 to switch between systems with minimal signaling. For instance, signaling might only be required to refresh an expiration timer (which could be set to a relatively long period, based in part on anticipated or provided device 1004 battery life, for instance) or to update tracking/location area, reducing idle mode power consumption at the mobile devices 1004.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include at least mobile IP home agent 302, correlation module 410, IP interface 406, network interface 404, and filtering module 514, or a different combination of these and other components. Sub-components could also be implemented as components communicatively coupled to other components rather than included within parent components. Additionally, it should be noted that one or more components could be combined into a single component providing aggregate functionality. For instance, routing module 518 can include broadcast module 512, or vice versa, to facilitate forwarding a received data communication utilizing a multicast transmission by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 11-14. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 11:
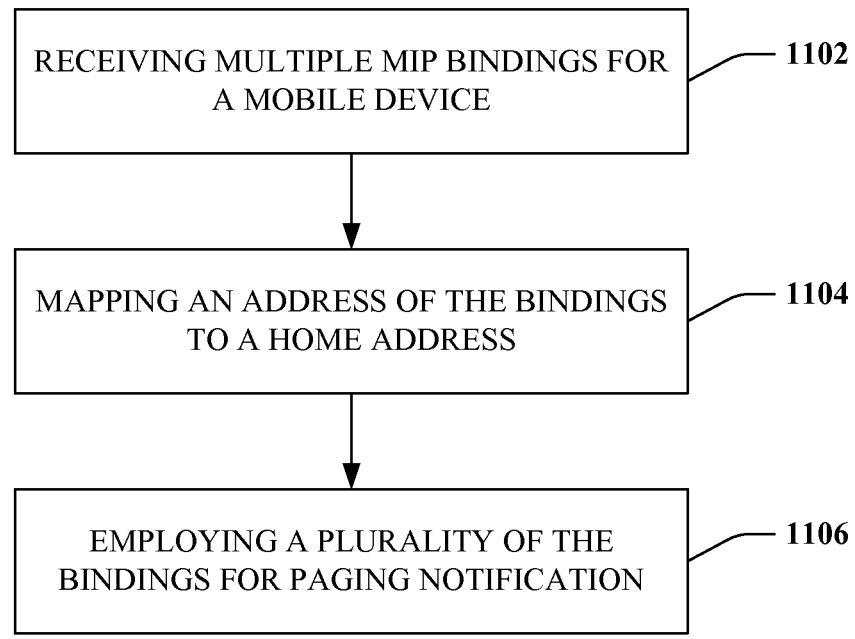
FIG. 11 depicts a flowchart of an example methodology for providing inter-system idle mobility management.

FIG. 11 illustrates a flowchart of an example methodology 1100 for providing inter-system idle mobility management according to one or more aspects of the subject disclosure. At 1102, method 1100 can receive multiple MIP bindings for a mobile device. The MIP bindings can each contain a CoA generated by a distinct mobile network. The CoA can facilitate, for instance, identifying a mobile network serving a mobile device, distinguishing among multiple mobile devices on a particular mobile network, routing data communication received at a network gateway to such devices, and/or like functions.

At 1104, method 1100 can map a system address of one or more of the MIP bindings to a home address associated with the mobile device. In one aspect, each of the system addresses is mapped to the home address. Received data communications addressed to the home address can reference the address map to determine mobile network system addresses bound to the home address.

At 1106, method 1100 can employ a plurality of the MIP bindings to notify the mobile device of a received packet communication. As discussed above, the received packet communication can contain the home address as a target address. After identifying the MIP bindings and system addresses associated with the home address, and identifying mobile networks issuing such system addresses, the received packet communication can be forwarded to at least a plurality of the identified mobile networks to facilitate routing the packet communication to the mobile device. It should be appreciated that, according to method 1100, in many circumstances it is not important to determine which of the multiple networks the mobile device is communicatively coupled with. As long as such network is included in the plurality of identified mobile networks, the communication can be routed to the mobile device. Accordingly, the mobile device can significantly reduce signaling associated with activating communications with the various networks.

Figure 12:
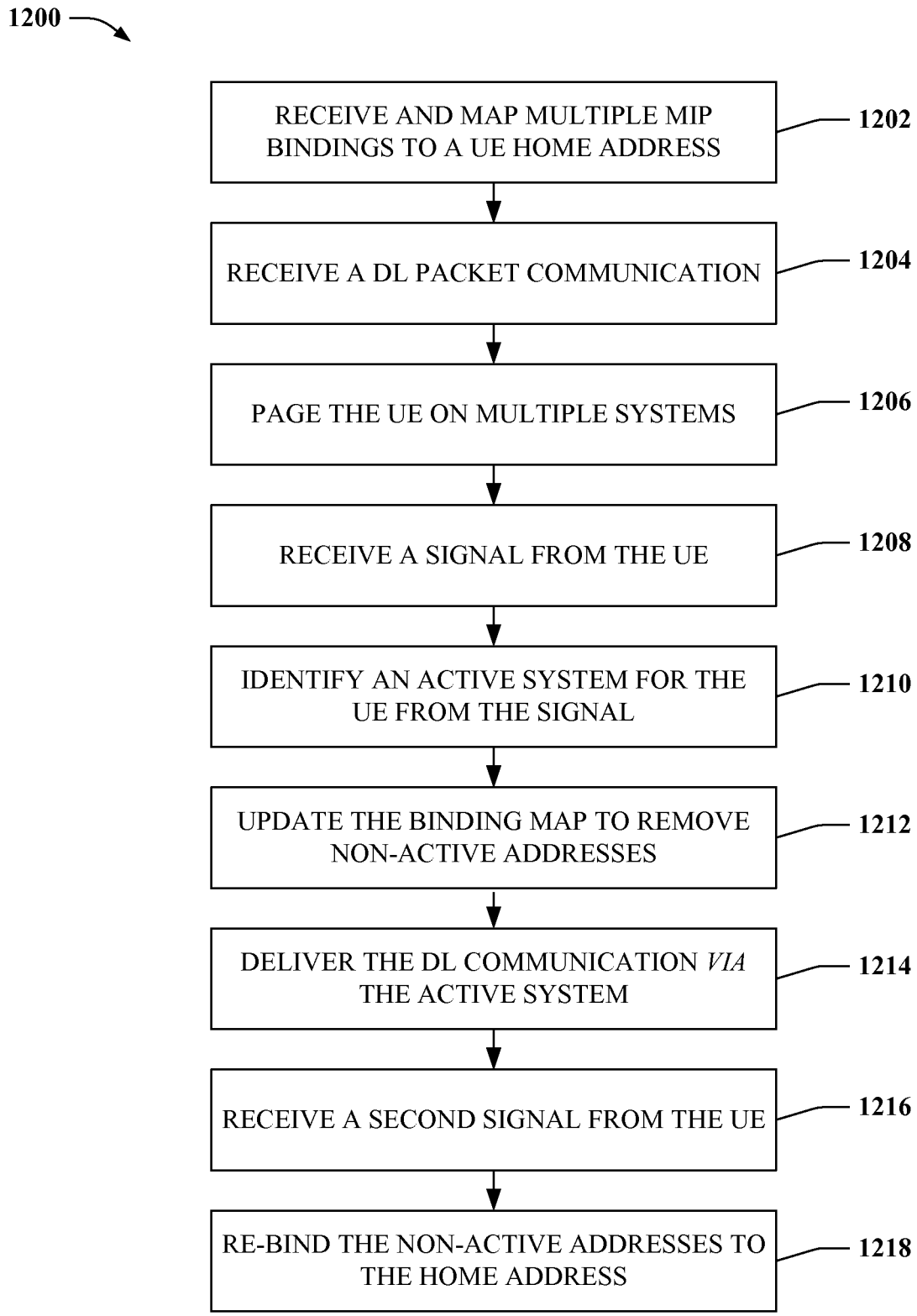
FIG. 12 illustrates a flowchart of an example methodology for delivering data communication in an inter-system environment.

FIG. 12 depicts a flowchart of an example methodology 1200 for managing idle mode mobility and facilitating data communication in an inter-system multi-mode environment. At 1202, method 1200 can receive and map multiple MIP bindings to a home address of a mobile device (UE). The MIP bindings can each comprise a CoA, or local system address, provided by a mobile network to the mobile device. At 1204, method 1200 can receive a download packet communication transmitted to the home address. The MIP binding map can be referenced to determine system addresses associated with the home address, and/or identify mobile networks potentially attached to the mobile device.

At 1206, method 1200 can initiate paging for the mobile device at a plurality of the multiple mobile networks. At 1208, a signal can be received that is originated from the mobile device. At 1210, an active mobile network coupled with the mobile device can be identified from the received signal. At 1212, method 1200 can update the MIP binding map to remove non-active system addresses bound to the home address of the mobile device. Data transmitted to the non-active system addresses can be terminated based on the updated binding, to preserve channel resources of the non-active mobile networks. At 1214, the download communication can be delivered to the active mobile network via the active system address. At 1216, a further signal can be received from the mobile device. The signal can be analyzed to determine its contents. If the further signal contains additional system addresses, the addresses can be bound to the home address at 1218 (or, e.g., un-bound from the home address) based on instructions contained in the further signal, or based on a current relationship of the additional system addresses and the home address. For instance, if a received system address is already bound to the home address, it can be unbound (e.g., to facilitate establishing a communication via an active network); if the received system address is not bound to the home address, it can be bound to it (e.g., to facilitate paging the mobile device on a plurality of networks).

Figure 13:
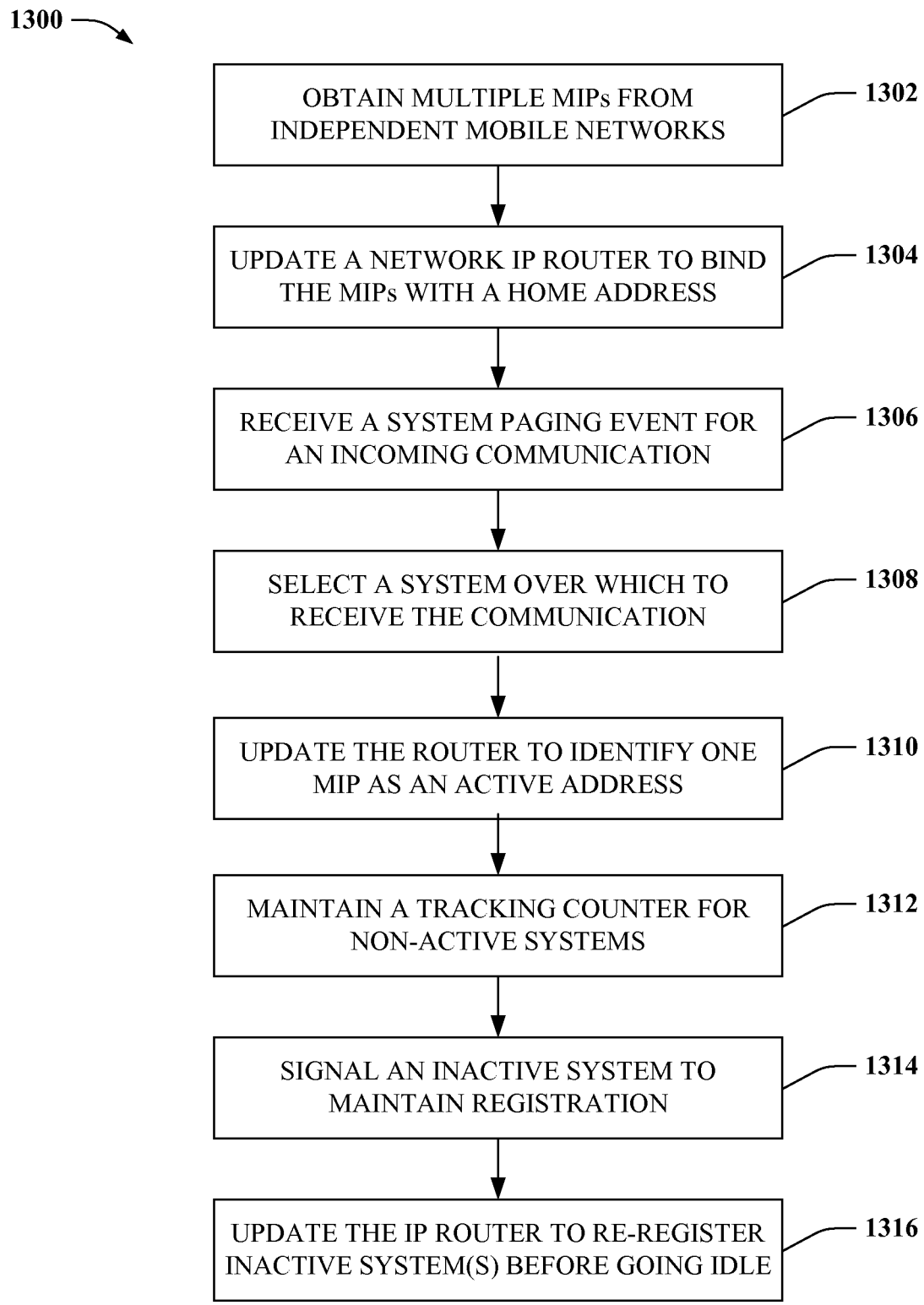
FIG. 13 depicts a flowchart of an example methodology for facilitating multi-system registration and idle mobility management according to further aspects.

FIG. 13 illustrates a flowchart of an example methodology 1300 for facilitating inter-system mobility management. Method 1300, at 1302, can obtain multiple MIP bindings from multiple mobile networks. The MIP bindings can each contain a system IP address provided by one of the mobile networks to a mobile device. The networks can be of different access mechanisms (e.g., CDMA, TDMA, OFDM, etc.) or architectures (e.g., 2G, 3G), such that idle mode mobility of at least one such mobile network is maintained independently from at least one of the other mobile networks. At 1304, method 1300 can update a network IP router and provide the system IP addresses to the network IP router. The IP router can be a network module, as described herein, that binds the system IP addresses to a home IP address of the mobile device to provide an IP interface for the mobile device to an IP network.

At 1306, method 1300 can receive a system paging event via at least one system IP address provided to the network IP router. At 1308, method 1300 can select a mobile network with which to receive the data communication associated with the paging event. The selection can be based on various suitable criteria, such as quality of wireless communications with a network(s), signal interference, signal strength, and/or the like. Method 1300, at 1310, can update the network IP router with to identify an active address among the system IP addresses. The update can comprise a signal identifying the active system IP address, or identifying inactive system IP addresses (e.g., that can be removed from a binding to the home IP address of the mobile device), or both.

At 1312, method 1300 can maintain a registration tracking counter at least for one or more non-active system IP addresses. In some aspects, the registration tracking counter (s) can match a similar counter maintained by a network component. At 1314, method 1300 can signal an inactive mobile network to maintain a registration with such network. The signal can be based, at least in part, on a value of a registration counter compared with a threshold expiration value. For instance, if the registration counter is within a threshold level of expiration, the signal can be sent to maintain the registration with such mobile network.

At 1316, method 1300 can update the network IP router with non-active system addresses (e.g., upon termination of a communication). The update can facilitate re-rebinding the non-active system addresses with the home IP address at the IP router to re-establish inter-system mobility management. Subsequently, an associated mobile device can go into an idle mode, for instance when the data communication received at reference number 1308, to reduce wireless signaling and preserve power. The mobile device can switch from a mobile network associated with a bound address to another such network without having to signal the network (except, for instance, to refresh a registration counter with a network as described herein).

Figure 14:
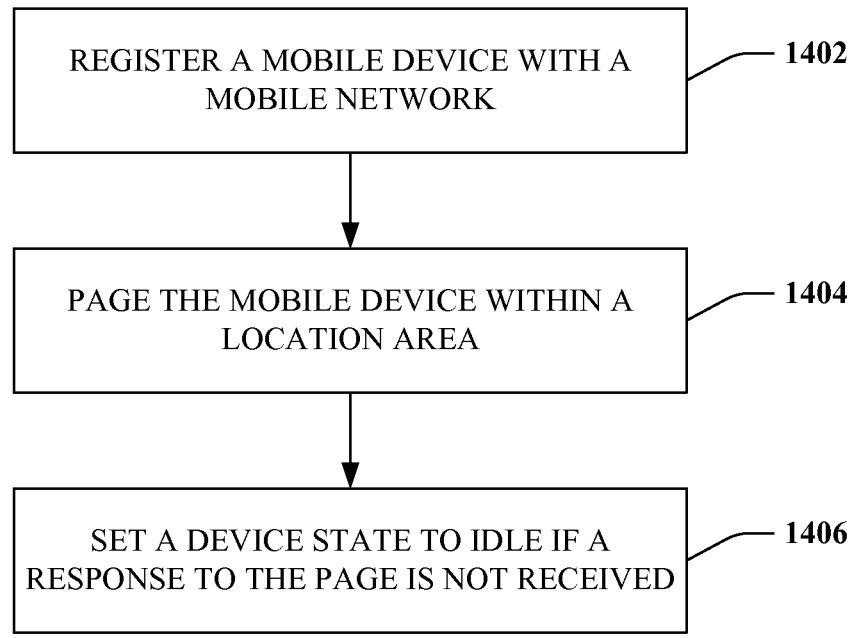
FIG. 14 illustrates a flowchart of an example methodology for facilitating inter-system idle mobility management according to at least one additional aspect.

FIG. 14 depicts a flowchart of a sample methodology 1400 for facilitating inter-system idle mobility for mobile devices in a wireless communication environment. At 1402, method 1400 can register a mobile device with a mobile network. Registration can be based on obtaining signals from the mobile device in conjunction with facilitating voice and/or data communication between the mobile device and a mobile network. At 1404, method 1400 can page the mobile device within a location area. The page can be initiated based on receiving communication data that comprises a system address associated with the mobile device by the mobile network. At 1406, method 1400 can set a device state to idle for the mobile device if a response to the page is not received. Accordingly, the registration of the mobile device need not be terminated based on a failure to receive the paging response. In some aspects, a registration counter can be maintained for the mobile device determining an expiration time for the registration of the mobile device, independent of paging response signals or lack of such response. According to some aspects, method 1400 can refresh the registration counter if signals are received from the mobile device prior to expiration of the timer. Accordingly, the mobile device can maintain the registration with minimal signaling requirements, significantly reducing power consumption in an idle mode for such device.

Figure 15:
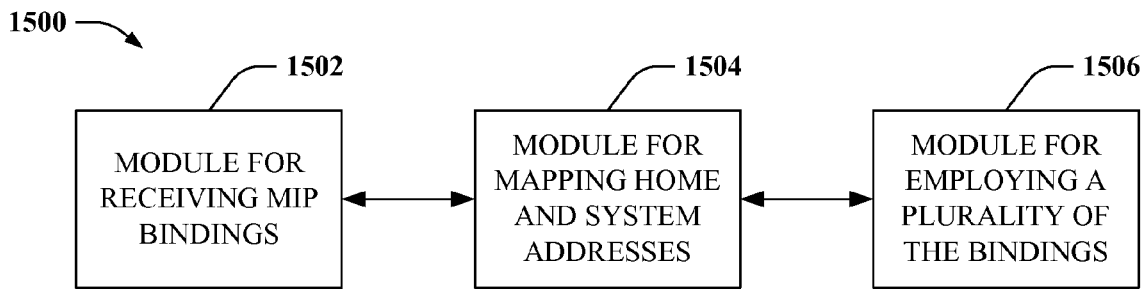
FIGS. 15, 16 and 17 depict block diagrams of example systems that facilitate mobility management for independent mobile systems.

FIG. 15 depicts a block diagram of an example system 1500 that can provide inter-system idle mobility management for mobile devices. In addition, system 1500 can facilitate reduced signaling between the mobile devices and associated mobile networks while managing mobility. System 1500 can comprise a module 1502 for receiving multiple MIP bindings associated with a mobile device. The bindings can be received via one or more wireless signals originated by a mobile device and received at the module 1502. Further, the MIP bindings can comprise a system address provided to the mobile device to facilitate data communication with such device. System 1500 can additionally comprise a module 1504 for mapping system addresses included in the MIP binding(s) to a home address of the mobile device providing the MIP bindings. In addition, system 1500 can comprise a module 1506 that employs a plurality of the bindings to notify the mobile device of a received data packet communication. As one example, the module 1506 can forward a portion of the communication, or data related to the communication, to a plurality of mobile networks associated with the plurality of system addresses. The forwarded data/communication can initiate a paging routine at each of the mobile networks to facilitate delivering the communication to the mobile device. It should be appreciated that system 1500 can enable recipient mobile devices to avoid signaling the mobile networks in many circumstances, such as where such devices switch between one network and another, yet remain within a common tracking/location area of such networks.

Figure 16:
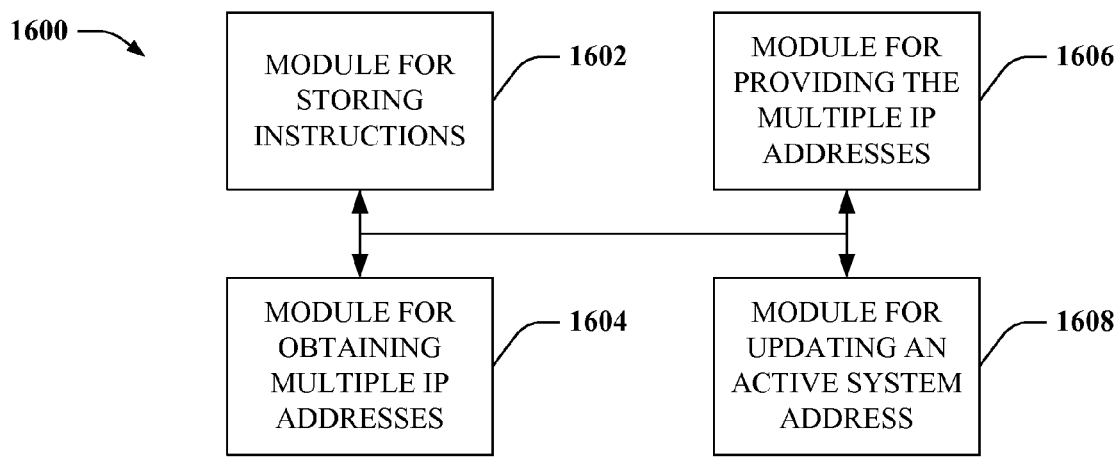

FIG. 16 illustrates a block diagram of an example system 1600 that facilitates idle mobility management for mobile devices in a multi-mode mobile environment. System 1600 can comprise a module 1602 for storing instructions suitable to conduct wireless communication with a remote device. In addition, the system 1600 can comprise a module 1604 for obtaining multiple system IP addresses from mobile networks that independently manage mobile device mobility. The system IP addresses can be obtained as a result of registering to communicate with such networks. Further, the system 1600 can comprise a module 1606 that provides the multiple addresses to a network routing device that binds the multiple addresses to a home IP address of a mobile device. Moreover, the system 1600 can further comprise a module 1608 for updating the network routing device with an active system address. The active address can then be utilized to forward data communications to the mobile device.

Figure 17:
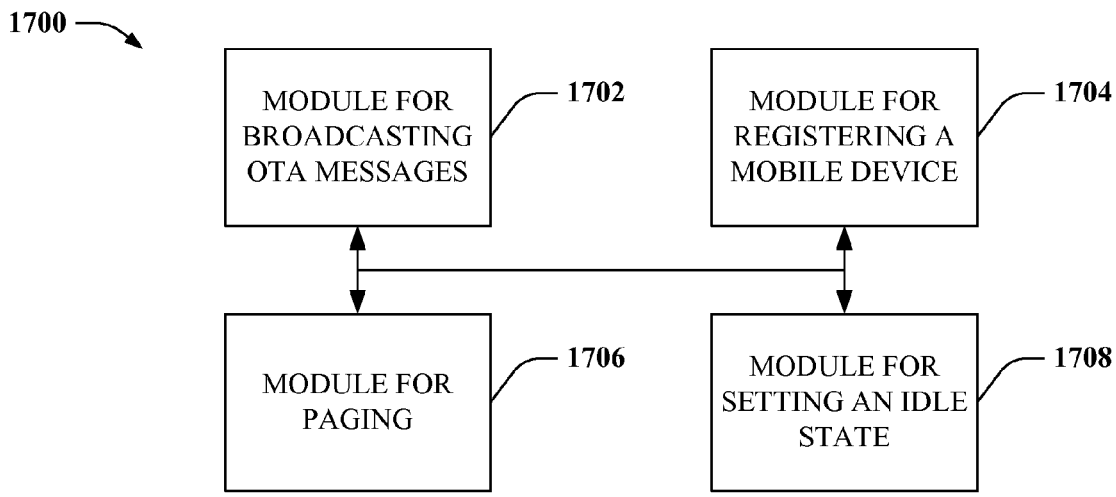

FIG. 17 depicts a block diagram of a sample system 1700 that further facilitates idle mobility management for mobile devices. System 1700 can comprise a module 1702 for broadcasting OTA messages. The module 1702 can broadcast such messages (e.g., utilizing a modulator, transmitter and one or more transmitting antennas) to a cellular site. Furthermore, the module 1702 can receive OTA message responses (e.g., utilizing a receiver, demodulator and one or more receive antennas) from remote devices (e.g., one or more mobile devices within the cellular site).

System 1700 can further comprise a module 1704 for registering a mobile device with a mobile network. The module 1704 can, for instance, obtain mobile device ID information (e.g., to distinguish the device among other devices), user profile information (e.g., to verify account information and administer charging/billing), and/or the like, from OTA messages received at module 1702. Such information can be forwarded to the mobile network. Further, module 1704 can obtain a CoA, or system address/system IP address, assigned by the mobile network, and forward the CoA to the mobile device.

In addition to the foregoing, system 1700 can comprise a module 1706 for paging the mobile device within a location area served by system 1700. The module 1706 can determine whether a response to the page is obtained by system 1700, based on OTA messages received at module 1702. If no response is received, module 1708 can set a state for the mobile device to idle with respect to the location area. The 'idle' state can be shared with the mobile network that provided the CoA, where suitable, to facilitate further communication. According to at least some aspects, module 1708 can further maintain a registration counter pertaining to the mobile device registration with the mobile network. The module 1708 can send a deletion message to the network, according to some aspects, if the expiration counter expires without receiving a signal from the mobile device. Thus, system 1700 can maintain the registration for the mobile device regardless of paging response, and utilize a registration counter to 'time out' the registration instead. Accordingly, the mobile device can significantly reduce signaling to system 1700 in order to maintain registration, preserving battery power at the mobile device.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method of inter-system mobility management, the method comprising:
    receiving multiple mobile Internet Protocol (MIP) bindings for a mobile device;
    mapping a system address of each of the multiple MIP bindings to a home address of the mobile device;
    employing two or more of the multiple MIP bindings to notify the mobile device of a received data packet communication;
    multicasting, to the mobile device via one or more systems associated with the two or more of the multiple MIP bindings, at least one of a portion of the received data packet communication or a notification message associated with the received data packet communication; and
    receiving a notification initiated by the mobile device that identifies one or more inactive system addresses of the two or more of the multiple MIP bindings.

2. The method of claim 1, further comprising:
    terminating multicasting; and
    employing an active system address to deliver the received data packet communication.

3. The method of claim 1, wherein notifying the mobile device comprises sending to the mobile device one of a MIP message, a data packet, a notification signal, or a paging signal.

4. The method of claim 1, wherein the notification comprises a notification response, and wherein the notification response comprises one of a binding update, a data packet, a notification response signal, or a paging response signal.

5. The method of claim 4, further comprising deleting all but a single system address associated with the multiple MIP bindings based on the notification response.

6. The method of claim 4, further comprising de-activating all but a single system address associated with the multiple MIP bindings based on the notification response.

7. The method of claim 6, further comprising:
receiving a second notification response initiated by the mobile device; and
performing at least one of activating an additional system address or re-activating at least one de-activated system address.

8. The method of claim 1, further comprising identifying an access network communicatively coupled to the mobile device.

9. The method of claim 8, further comprising forwarding the received data packet communication to a gateway of the access network.

10. The method of claim 1, wherein the notification is initiated by the mobile device in response to the mobile device being notified via the two or more of the multiple MIP bindings.

11. The method of claim 1, wherein the notification identifies the one or more inactive system addresses and an active system address.

12. The method of claim 1, further comprising:
receiving a second notification initiated by the mobile device; and
based on the second notification, performing at least one of:
mapping an additional MIP binding to the home address; and
re-mapping at least one of the multiple MIP bindings to the home address.

13. The method of claim 1, wherein a first system of the one or more systems is associated with a first MIP binding of the two or more of the multiple MIP bindings.

14. A mobile internet protocol (MIP) home agent configured to provide inter-system mobility management, the MIP home agent comprising:
a network interface configured to obtain data initiated by a mobile device, wherein the data indicates multiple MIP bindings for the mobile device;
a correlation module configured to map a system address for each of the multiple MIP bindings to a home address of the mobile device to generate address mappings;
one or more memories configured to store at least the data and the address mappings; and
a routing module configured to:
employ two or more of the multiple MIP bindings to notify the mobile device of a received data packet communication;
trigger a MIP binding response from the mobile device, wherein the network interface is configured to receive a notification initiated by the mobile device, and wherein the notification identifies one or more inactive system addresses of the two or more of the multiple MIP bindings; and
a broadcast module configured to employ the network interface to multicast, to multiple access gateways associated with each of the two or more of the multiple MIP bindings, at least one of a portion of the received data packet communication or a notification message associated with the received data packet communication.

15. The MIP home agent of claim 14, further comprising a communication processor configured to:
terminate the multicast; and
instruct the routing module to employ an active system address to deliver the received data packet communication.

16. The MIP home agent of claim 14, wherein the routing module notifies the mobile device by employing a MIP message, a data packet, a notification signal, a paging signal, or a combination thereof.

17. The MIP home agent of claim 14, wherein the notification comprises a notification response, and wherein the notification response comprises at least one of a binding update, a data packet, a notification response signal, or a paging response signal.

18. The MIP home agent of claim 17, wherein the correlation module is configured to update the address mappings, and wherein the address mappings are updatable, based on the notification response, to include only an active system address associated with the mobile device.

19. The MIP home agent of claim 18, wherein:
the network interface is configured to receive a second notification response originated at the mobile device; and
the correlation module is configured to further update the address mappings, based on the second notification response, to associate the home address with an additional system address or to re-associate the home address with at least one deleted system address.

20. The MIP home agent of claim 17, wherein the correlation module is configured to update the address mappings, and wherein the address mappings are updatable, based on the notification response, to de-activate all but a single system address associated with the mobile device.

21. The MIP home agent of claim 20, wherein:
the network interface receives an additional notification response originated at the mobile device; and
the correlation module further updates the address mappings, based on an additional binding update, to activate an additional system address or re-activate at least one de-activated system address.

22. The MIP home agent of claim 14, further comprising a filtering module configured to identify an access network communicatively coupled to the mobile device.

23. The MIP home agent of claim 22, wherein the routing module forwards the received data packet communication to a gateway of the access network.

24. The MIP home agent of claim 14, wherein each gateway of the multiple gateways is associated with a corresponding MIP binding of the two or more of the multiple MIP bindings.

25. An apparatus configured to provide inter-system mobility management, the apparatus comprising:
means for receiving multiple mobile internet protocol (MIP) bindings for a mobile device;
means for mapping a system address of each of the multiple MIP bindings to a home address of the mobile device;
means for employing two or more of the multiple MIP bindings to notify the mobile device of a received data packet communication;
means for multicasting, to the mobile device via one or more systems associated with the two or more of the multiple MIP bindings, at least one of a portion of the received data packet communication or a notification message associated with the received data packet communication; and
means for receiving a notification that identifies one or more inactive system addresses of the two or more of the multiple MIP bindings, wherein the notification originates at the mobile device.

26. A processor configured to provide inter-system mobility management, the processor comprising:

a first module configured to receive multiple mobile internet protocol (MIP) bindings for a mobile device, wherein the first module receives a notification originating at the mobile device, and wherein the notification identifies one or more inactive system addresses of the multiple MIP bindings;

a second module configured to map a system address of each of the multiple MIP bindings to a home address of the mobile device;

a third module configured to employ two or more of the multiple MIP bindings to notify the mobile device of a received data packet communication; and a fourth module configured to multicast, to the mobile device via one or more systems associated with the two or more of the multiple MIP bindings, at least one of a portion of the received data packet communication or a notification message associated with the received data packet communication.

27. A non-transitory computer-readable medium comprising:

computer-readable instructions configured to provide inter-system mobility management, the instructions executable by at least one computer to cause the at least one computer to:

receive multiple mobile internet protocol (MIP) bindings for a mobile device;

map a system address of each of the multiple MIP bindings to a home address of the mobile device;

employ two or more of the multiple MIP bindings to notify the mobile device of a received data packet communication;

multicast, to the mobile device via one or more systems associated with the two or more of the multiple MIP bindings, at least one of a portion of the received data packet communication or a notification message associated with the received data packet communication; and receive a notification originating from the mobile device, wherein the notification identifies one or more inactive system addresses of the two or more of the multiple MIP bindings.

28. A method for facilitating idle mobility management, the method comprising:

obtaining, at a mobile device, multiple addresses, wherein each address of the multiple addresses is obtained from a corresponding mobile network, and wherein each corresponding mobile network independently manages idle mobility;

providing the multiple addresses to a network routing device that binds the multiple addresses to a home address;

receiving a first paging signal directed to a first address of the multiple addresses from a first mobile network;

receiving a second paging signal directed to a second address of the multiple addresses from a second mobile network; and selecting one of the first address or the second address as an active address based on a first signal quality characteristic of the first paging signal and a second signal quality characteristic of the second paging signal.

29. The method of claim 28, further comprising initiating an update at the network routing device to identify the active address.

30. The method of claim 28, wherein the first signal quality characteristic comprises a peak to average power ratio associated with the first paging signal.

31. The method of claim 28, further comprising activating communication with one of the first mobile network or the second mobile network based on a paging event received from the first mobile network or the second mobile network.

32. The method of claim 28, further comprising maintaining a tracking area registration counter for at least one inactive mobile network.

33. The method of claim 32, further comprising initiating a tracking area update with the at least one inactive mobile network prior to expiration of the tracking area registration counter.

34. The method of claim 28, further comprising receiving a data packet communication from the network routing device via the first mobile network when the first mobile network is associated with the active address.

35. The method of claim 34, further comprising:

activating an additional address of the multiple addresses, wherein the active address is a different address than the additional address; and initiating an update at the routing device to identify the additional address as an additional active address.

36. The method of claim 35, further comprising receiving a portion of a subsequent data packet communication via a third mobile network associated with the additional active address.

37. The method of claim 28, further comprising re-registering at least one non-active internet protocol address with the routing device prior to the mobile device entering an idle mode.

38. The method of claim 28, further comprising:

detecting a transmission from a particular mobile network associated with an inactive address;

referencing a tracking area registration expiration counter associated with the inactive address; and refraining from re-registering with the particular mobile network associated with the inactive address prior to the tracking area registration expiration counter exceeding a threshold time value.

39. The method of claim 28, further comprising, after selecting one of the first address or the second address as the active address, transmitting to the routing device a notification that identifies one or more inactive addresses of the multiple addresses.

40. The method of claim 28, further comprising:

determining the first signal quality characteristic, wherein the first signal quality characteristic comprises a first peak to average power ratio associated with the first paging signal;

determining the second signal quality characteristic, wherein the second signal quality characteristic comprises a second peak to average power ratio associated with the second paging signal; and wherein selecting one of the first address or the second address as the active address comprises:

performing a comparison between the first signal quality characteristic and the second signal quality characteristic; and identifying the active address based on the comparison.

41. An apparatus configured to facilitate idle mobility management, the apparatus comprising:

one or more memories configured to store instructions suitable to conduct wireless communication with a remote device;

a signal processor configured to obtain multiple addresses, wherein each address of the multiple addresses is obtained from a corresponding mobile network, and wherein each corresponding mobile network independently manages idle mobility;
a transmission processor configured to provide the multiple addresses to a network routing device configured to bind the multiple addresses to a home address;
an antenna configured to receive:
 a first paging signal directed to a first address of the multiple addresses from a first mobile network; and
 a second paging signal directed to a second address of the multiple addresses from a second mobile network; and
a communication module configured to select one of the first address or the second address as an active address based on a first signal quality characteristic of the first paging signal and a second signal quality characteristic of the second paging signal.

42. The apparatus of claim 41, wherein the first signal quality characteristic comprises a signal strength associated with the first paging signal.

43. The apparatus of claim 41, wherein the transmission processor activates communication with the first mobile network or the second mobile network based on a paging event received from the first mobile network or the second mobile network.

44. The apparatus of claim 41, further comprising a timing module configured to maintain a tracking area registration counter for at least one inactive mobile network.

45. The apparatus of claim 44, wherein the transmission processor initiates a tracking area update with the at least one inactive mobile network prior to expiration of the tracking area registration counter.

46. The apparatus of claim 41, wherein the signal processor obtains a data packet communication from the network routing device via a transmitter associated with the active address.

47. The apparatus of claim 46, further comprising an activation module is configured to:
 initiate an update at the network routing device to identify the active address; and
 initiate an additional update at the network routing device to identify an additional address of the multiple addresses as an additional active address, wherein the communication module is configured to activate the additional address.

48. The apparatus of claim 47, wherein the signal processor obtains a portion of a subsequent data packet communication via an additional mobile network associated with the additional active address.

49. The apparatus of claim 41, further comprising:
 a timing module configured to reference a tracking area registration expiration counter associated with an inactive address, wherein the signal processor detects a transmission from a particular mobile network associated with the inactive address; and
 an activation module configured to refrain from re-registering with the particular mobile network associated with the inactive address prior to the tracking area registration expiration counter exceeding a threshold time.

50. An apparatus configured to facilitate idle mobility management, the apparatus comprising:
 means for storing instructions suitable to conduct wireless communication with a remote device;
 means for obtaining multiple addresses, wherein each address of the multiple addresses is obtained from a corresponding mobile network, and wherein each corresponding mobile network independently manages idle mobility;
 means for providing the multiple addresses to a network routing device that binds the multiple addresses to a home address;
 means for receiving a first paging signal directed to a first address of the multiple addresses from a first mobile network;
 means for receiving a second paging signal directed to a second address of the multiple addresses from a second mobile network;
 means for selecting one of the first address or the second address as an active address based on a first signal quality characteristic of the first paging signal and a second signal quality characteristic of the second paging signal; and
 means for initiating an update at the network routing device to identify the active address.

51. A processor configured to facilitate idle mobility management, the processor comprising:
 a first module configured to obtain multiple addresses, wherein each address of the multiple addresses is obtained from a corresponding mobile network, and wherein each corresponding mobile network independently manages idle mobility;
 a second module configured to provide the multiple addresses to a network routing device that binds the multiple addresses to a home address;
 an antenna configured to receive:
  a first paging signal directed to a first address of the multiple addresses from a first mobile network; and
  a second paging signal directed to a second address of the multiple addresses from a second mobile network;
 a third module configured to select one of the first address or the second address as an active address based on a first signal quality characteristic of the first paging signal and a second quality characteristic of the second paging signal; and
 a fourth module configured to initiate an update at the network routing device to identify the active address.

52. A non-transitory computer-readable medium comprising:
 computer-readable instructions configured to facilitate idle mobility management, the instructions executable by at least one computer to cause the at least one computer to:
  obtain multiple addresses, wherein each address of the multiple addresses is obtained from a corresponding mobile network, and wherein each corresponding mobile network independently manages idle mobility;
  provide the multiple addresses to a network routing device that binds the multiple addresses to a home address;
  receive a first paging signal directed to a first address of the multiple addresses from a first mobile network and a second paging signal directed to a second address of the multiple addresses from a second mobile network;
  select one of the first address or the second address as an active address based on a first signal quality characteristic of the first paging signal and a second signal quality characteristic of the second paging signal; and
  initiate an update at the network routing device to identify the active address.

53. A method of inter-system mobility management, the method comprising:
 receiving multiple mobile internet protocol (MIP) bindings for a mobile device;

mapping a system address of each of the multiple MIP bindings to a home address of the mobile device;
employing two or more of the multiple MIP bindings to notify the mobile device of a received data packet communication by forwarding one of a MIP signal, a data packet, or a paging signal to a first wireless access point and a second wireless access point, wherein the first wireless access point is associated with a first mobile network identified by a first MIP binding of the two or more of the multiple MIP bindings, and wherein the second wireless access point is associated with a second mobile network identified by a second MIP binding of the two or more of the multiple MIP bindings;
multicasting, to the mobile device via one or more systems associated with the two or more of the multiple MIP bindings, at least one of a portion of the received data packet communication or a notification message associated with the received data packet communication;
receiving a notification response initiated by the mobile device via the first wireless access point, wherein the notification response identifies one or more inactive system addresses of the two or more of the multiple MIP bindings; and
in response to receiving the notification response, sending an indication to the second mobile network to terminate the one of the MIP signal, the data packet, or the paging signal at the second mobile network, wherein the second mobile network is configured to discard the one of the MIP signal, the data packet, or the paging signal.

54. The method of claim 53, wherein the one of the MIP signal, the data packet, or the paging signal is forwarded from a home agent to the first wireless access point and to the second wireless access point.

55. An apparatus configured to provide inter-system mobility management, the apparatus comprising:
means for receiving multiple mobile internet protocol (MIP) bindings for a mobile device;
means for mapping a system address of each of the multiple MIP bindings to a home address of the mobile device;
means for employing two or more of the multiple MIP bindings to notify the mobile device of a received data packet communication by forwarding one of a MIP signal, a data packet, or a paging signal to a first wireless access point and a second wireless access point, wherein the first wireless access point is associated with a first mobile network identified by a first MIP binding of the two or more of the multiple MIP bindings, and wherein the second wireless access point is associated with a second mobile network identified by a second MIP binding of the two or more of the multiple MIP bindings;
means for multicasting, to the mobile device via one or more systems associated with the two or more of the multiple MIP bindings, at least one of a portion of the received data packet communication or a notification message associated with the received data packet communication;
means for receiving a notification response initiated by the mobile device via the first wireless access point, wherein the notification response identifies one or more inactive system addresses of the two or more of the multiple MIP bindings; and
means for sending, in response to receiving the notification response, an indication to the second mobile network to terminate the one of the MIP signal, the data packet, or the paging signal.

\* \* \* \* \*